United States Patent
Davis et al.

(10) Patent No.: US 9,681,337 B2
(45) Date of Patent: Jun. 13, 2017

(54) SATELLITE-TO-SATELLITE HANDOFF IN SATELLITE COMMUNICATIONS SYSTEM

(71) Applicant: QUALCOMM Incorporated, San Diego, CA (US)

(72) Inventors: Roy Howard Davis, Del Mar, CA (US); Mario Mark Scipione, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/857,560

(22) Filed: Sep. 17, 2015

(65) Prior Publication Data

US 2017/0041830 A1 Feb. 9, 2017

Related U.S. Application Data

(60) Provisional application No. 62/201,514, filed on Aug. 5, 2015.

(51) Int. Cl.
*H04W 4/00* (2009.01)
*H04W 36/00* (2009.01)
(Continued)

(52) U.S. Cl.
CPC .... *H04W 36/0005* (2013.01); *H04B 7/18521* (2013.01); *H04B 7/18541* (2013.01); *H04W 36/0088* (2013.01); *H04W 84/06* (2013.01)

(58) Field of Classification Search
CPC ......... H04W 36/0005; H04W 36/0088; H04W 84/06; H04B 7/18521; H04B 7/18541
(Continued)

(56) References Cited

U.S. PATENT DOCUMENTS 5,784,695 A * 7/1998 Upton ................ H04B 7/18541
455/12.1
5,999,797 A * 12/1999 Zancho .............. H04B 7/18539
370/316
(Continued)

FOREIGN PATENT DOCUMENTS

| EP | 0536921 A1 | 4/1993 |
| EP | 0637142 A1 | 2/1995 |
| WO | WO-2015013216 A1 | 1/2015 |

OTHER PUBLICATIONS

Sarddar D., et al., "A New Method for Fast and Low Cost Handover in Leo Satellites," International Journal of Computer Applications, Jan. 2012, vol. 37 (7), pp. 39-45.
(Continued)

*Primary Examiner* — Khai M Nguyen
(74) *Attorney, Agent, or Firm* — Loza & Loza LLP

(57) ABSTRACT

Aspects of the disclosure provide a handoff procedure for a satellite communication system such as a broadband low-Earth orbit (LEO) satellite communication system. A gateway and a user terminal (UT) coordinate and schedule a satellite-to-satellite handoff in such a way that there are no messaging round-trip delays between the last return service link (RSL) packet transmitted from the user terminal to the source satellite and the first RSL packet transmitted from the user terminal to the target satellite. Therefore, an outage on the return link (from the user terminal to the gateway) can be limited to the actual time for moving the antenna feed from the source satellite to the target satellite. Furthermore, an outage on the forward link (from the gateway to the user terminal) can be limited to a single round-trip delay in addition to the time for moving the antenna feed.

30 Claims, 16 Drawing Sheets

(51) Int. Cl.
*H04B 7/185* (2006.01)
*H04W 84/06* (2009.01)

(58) Field of Classification Search
USPC .................................. 455/427, 424, 425, 436
See application file for complete search history.

(56) References Cited

U.S. PATENT DOCUMENTS

| | | | | |
|---|---|---|---|---|
| 6,128,488 | A * | 10/2000 | Sauvageot | H04B 7/18541 455/428 |
| 6,157,624 | A * | 12/2000 | Zancho | H04B 7/18558 370/316 |
| 6,198,907 | B1 * | 3/2001 | Torkington | H04B 7/18541 455/12.1 |
| 6,208,858 | B1 * | 3/2001 | Antonio | H04B 7/18534 370/331 |
| 6,272,345 | B1 * | 8/2001 | Worger | H04B 7/18541 455/12.1 |
| 6,400,946 | B1 * | 6/2002 | Vazvan | H04B 7/18563 455/432.1 |
| 6,512,920 | B1 * | 1/2003 | Yaoya | H04B 7/18541 455/427 |
| 8,712,321 | B1 | 4/2014 | Dankberg | |
| 2007/0123252 | A1 * | 5/2007 | Tronc | H04B 7/18563 455/427 |
| 2007/0135040 | A1 * | 6/2007 | Draim | H04B 7/18541 455/12.1 |
| 2007/0184849 | A1 * | 8/2007 | Zheng | H04B 7/06 455/456.1 |
| 2013/0286934 | A1 | 10/2013 | Monte et al. | |
| 2015/0340762 | A1 * | 11/2015 | Yakubovitch | H01Q 3/24 342/374 |
| 2015/0381263 | A1 * | 12/2015 | Lejnell | H04B 7/18508 370/316 |

OTHER PUBLICATIONS

International Search Report and Written Opinion—PCT/US2016/043546—ISA/EPO—Oct. 24, 2016.

* cited by examiner

Return Link First
Single-Gateway Version

Return Link First
Dual-Gateway Version

Forward Link First
Single-Gateway Version

Forward Link First
Dual-Gateway Version

SATELLITE-TO-SATELLITE HANDOFF IN SATELLITE COMMUNICATIONS SYSTEM

PRIORITY CLAIM

This application claims priority to and the benefit of provisional patent application No. 62/201,514, filed in the United States Patent and Trademark Office on Aug. 5, 2015, the entire content of which is incorporated herein by reference.

INTRODUCTION

Various aspects described herein relate to satellite communications, and more particularly, to a satellite-to-satellite handoff for a user terminal in a non-geosynchronous satellite communication system.

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits, such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several unique challenges relating to satellite-to-satellite handoff procedures. In particular, to maintain a high-quality user experience and reduce or minimize call drops or delays during the handoff, it is desired to minimize any disconnection of a data link during a satellite-to-satellite handoff.

SUMMARY

Aspects of the disclosure are directed to apparatus and methods for satellite-to-satellite handoff in non-geosynchronous satellite communication systems.

An aspect of the disclosure provides a method of operating a user terminal (UT) to perform a handoff operation from a first satellite to a second satellite. The UT communicates with a first gateway over a forward link and a return link via the first satellite, and the UT receives a handoff message from the first gateway via the first satellite. The handoff message includes information sufficient for the UT to identify the second satellite for the handoff, and to determine a time for the handoff from the first satellite to the second satellite. The UT schedules the handoff from the first satellite to the second satellite in accordance with the handoff message, and executes the handoff from the first satellite to the second satellite.

Another aspect of the disclosure provides a user terminal (UT) configured to perform a handoff operation from a first satellite to a second satellite. The UT includes a memory with handoff instructions and at least one processor operatively coupled to the memory. The processor is configured by the handoff instructions to perform various operations. The processor is configured to communicate with a first gateway over a forward link and a return link via the first satellite. The processor is configured to receive a handoff message from the first gateway via the first satellite, wherein the handoff message includes information sufficient for the UT to identify the second satellite for the handoff, and to determine a time for the handoff from the first satellite to the second satellite. The processor is configured to schedule the handoff from the first satellite to the second satellite in accordance with the handoff message, and execute the handoff from the first satellite to the second satellite.

Yet another aspect of the disclosure provides a user terminal (UT) configured to perform a handoff operation from a first satellite to a second satellite. The UT includes means for communicating with a first gateway over a forward link and a return link via the first satellite. The UT includes means for receiving a handoff message from the first gateway via the first satellite, wherein the handoff message includes information sufficient for the UT to identify the second satellite for the handoff, and to determine a time for the handoff from the first satellite to the second satellite. The UT includes means for scheduling the handoff from the first satellite to the second satellite in accordance with the handoff message. The UT further includes means for executing the handoff from the first satellite to the second satellite.

Still another aspect of the disclosure provides a non-transitory computer-readable medium, including a plurality of instructions for causing a user terminal (UT) to perform a handoff operation from a first satellite to a second satellite. The instructions cause the UT to communicate with a first gateway over a forward link and a return link via the first satellite. The instructions further cause the UT to receive a handoff message from the first gateway via the first satellite, wherein the handoff message includes information sufficient for the UT to identify the second satellite for the handoff, and to determine a time for the handoff from the first satellite to the second satellite. The instructions further cause the UT to schedule the handoff from the first satellite to the second satellite in accordance with the handoff message, and execute the handoff from the first satellite to the second satellite.

BRIEF DESCRIPTION OF THE DRAWINGS

The accompanying drawings are presented to aid in the description of aspects of the disclosure and are provided solely for illustration of the aspects and not limitations thereof.

Like reference numerals refer to corresponding parts throughout the drawing figures.

DETAILED DESCRIPTION

Figure 1:
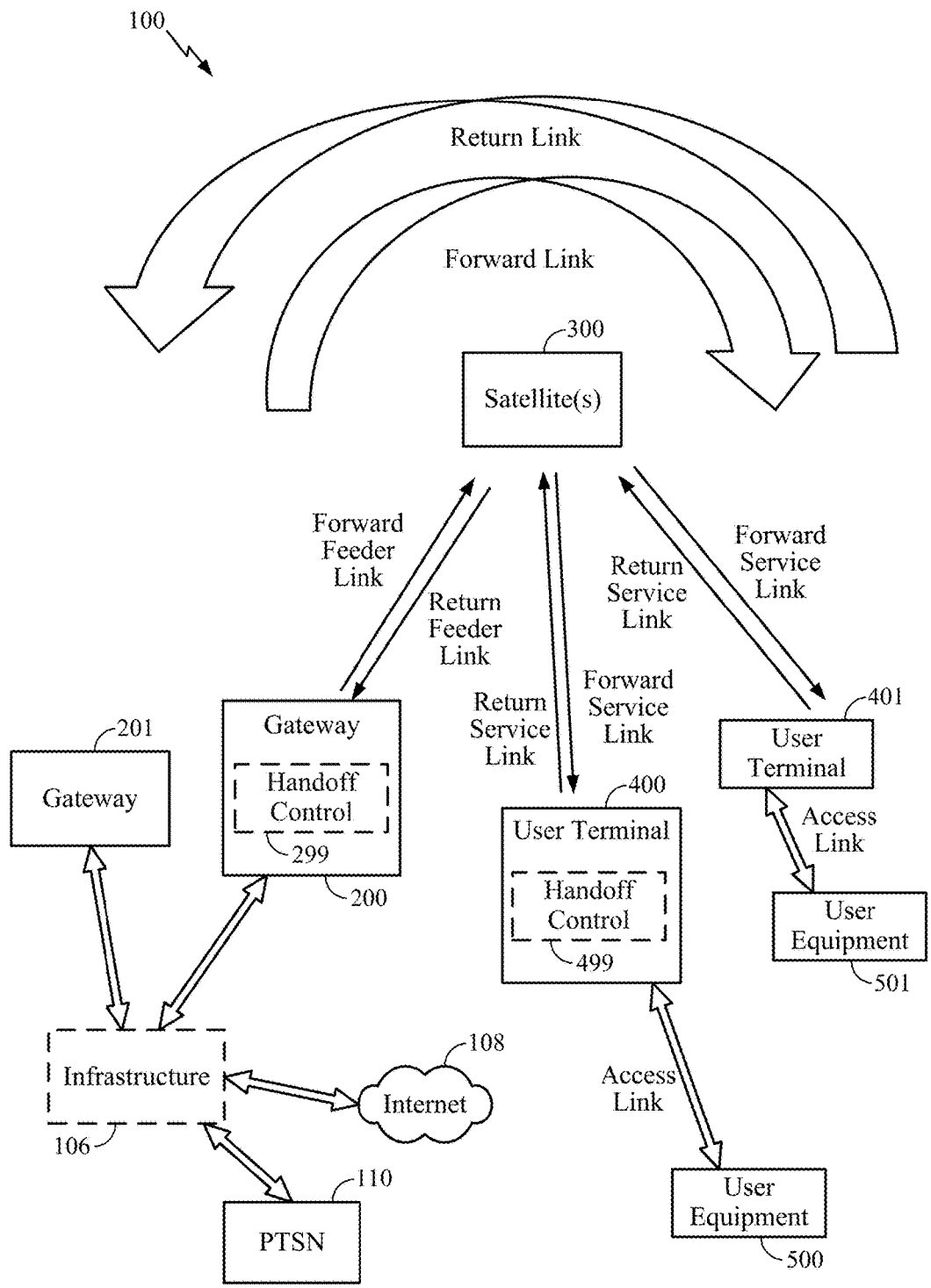
FIG. 1 is a block diagram of an example communication system.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Various aspects of the disclosure provide a handoff procedure for a satellite communication system such as a broadband low-Earth orbit (LEO) satellite communication system. As described in further detail below, some aspects provide for a gateway and a user terminal to coordinate and schedule a satellite-to-satellite handoff in such a way that there may be no messaging round-trip delays between the last return service link (RSL) packet transmitted from the user terminal to the source satellite and the first RSL packet transmitted from the user terminal to the target satellite. In this way, any outage on the return link (from the user terminal to the gateway) and any outage on the forward link (from the gateway to the user terminal) can be reduced or limited.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link (FL) and a return link (RL) or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" (FFL) whereas the signal path from the satellite 300 to the gateway 200 is labeled "Return Feeder Link" (RFL) in FIG. 1. In a similar manner, the signal path from each UT 400 or 401 to the satellite 300 is labeled "Return Service Link" (RSL) whereas the signal path from the satellite 300 to each UT 400 or 401 is labeled "Forward Service Link" (FSL) in FIG. 1.

In a handoff operation, a UT 400 may initially be in communication with a gateway 200 via one of the first satellites 300 (e.g., a first satellite). As the first satellite orbits around the Earth, the gateway 200 and/or the UT 400 may not be able to communicate with each other via the first satellite. In some aspects of the disclosure, the UT 400 may be a mobile unit that can move away from the communication range of the first satellite. In various aspects of the disclosure, the gateway 200 includes a handoff control block 299 that can cause the gateway 200 to perform a handoff procedure that enables the UT to switch or hand off to a different satellite 300 (e.g., a second satellite) with reduced messaging-related delays. After the handoff, the UT 400 may continue to communicate with the same gateway 200 or a different gateway 201. The UT 400 may also include a handoff control block 499 configured to perform handoff functions that will be described in further detail below, e.g., in relation to FIGS. 7-16.

Figure 2:
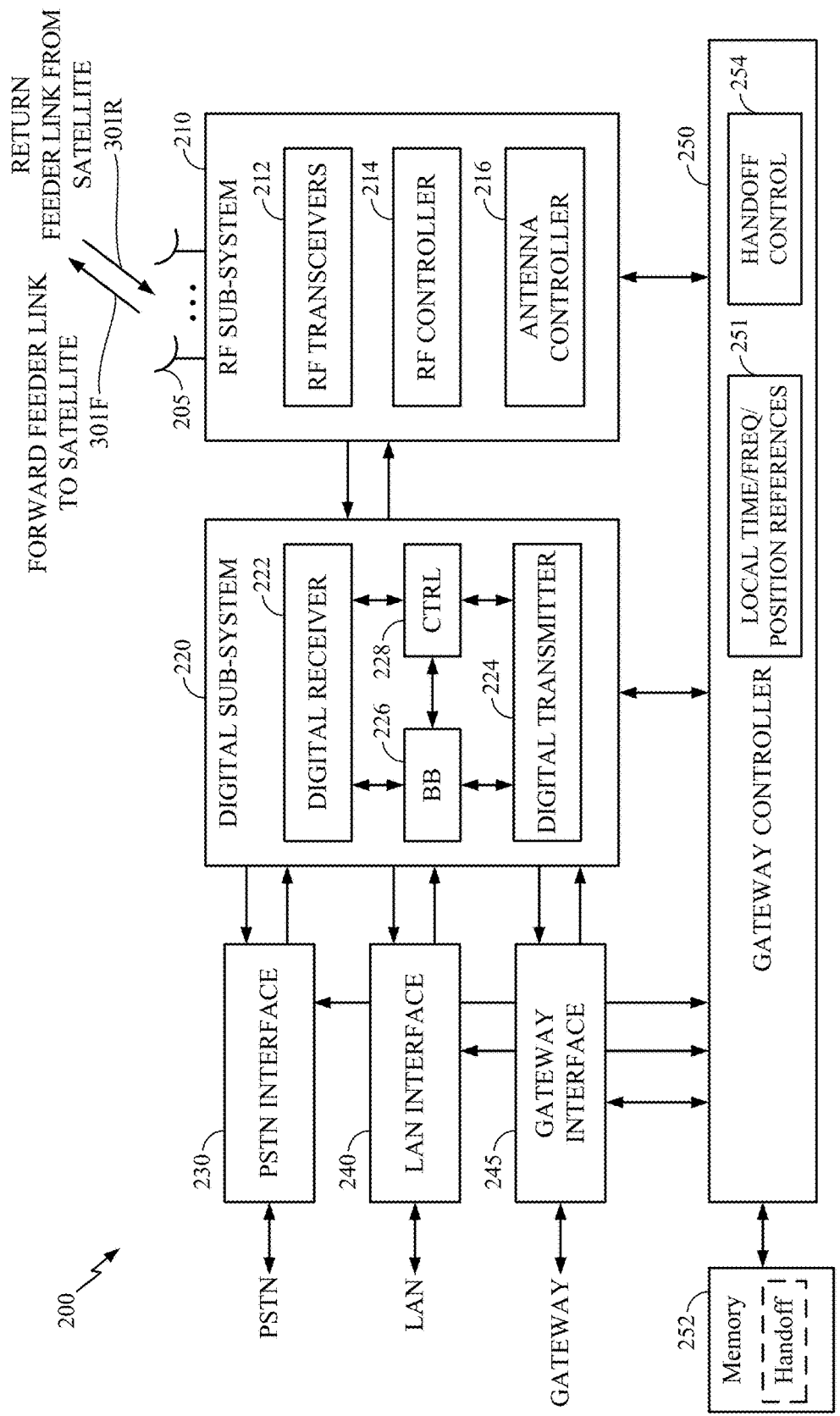
FIG. 2 is a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245. In various examples, the gateway controller 250 may be implemented by the processing circuit 1602 illustrated in FIG. 16.

The gateway controller 250 is coupled to a memory 252. The memory 252 may include instructions for execution by the gateway controller 250 as well as data for processing by the gateway controller 250. The memory 252 may include a non-transitory computer-readable medium (e.g., one or more nonvolatile memory elements, such as EPROM, EEPROM, Flash memory, a hard drive, etc.) storing instructions that, when executed by the processor, causes the gateway 200 to perform operations including (but not limited to) those described herein. For example, the instructions may include code for performing satellite-to-satellite handoff methods and procedures with reduced messaging delays between the gateway and a UT as described below and illustrated in FIGS. 8-15.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, positioning, pointing, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300. The gateway controller 250 may further include a handoff control block 254, which may be configured by the handoff software in the memory 252. The handoff control block 254 may plan, control, and facilitate the handoff of a UT from one satellite to another while minimizing the disruption to the communication between the UT and the gateway in accordance with the methods described below and illustrated in FIGS. 8-15. For example, the handoff control block 254 may be configured to generate and transmit to a UT one or more control messages configured to facilitate a satellite-to-satellite handoff, by enabling the UT to point at a new satellite (a target satellite), such as a start time or window of time when the UT is to execute the handoff, and information respecting the time and frequency resources (communication resources) for the UT to use to transmit to the target satellite. These control messages may include a handoff message, broadcast control information, and/or an ephemeris broadcast. The handoff control block 254 may further be configured to receive and process a handoff acknowledgment message, which may be received from the UT in response to the handoff message.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handoffs, and to perform various other well-known functions.

Figure 3:
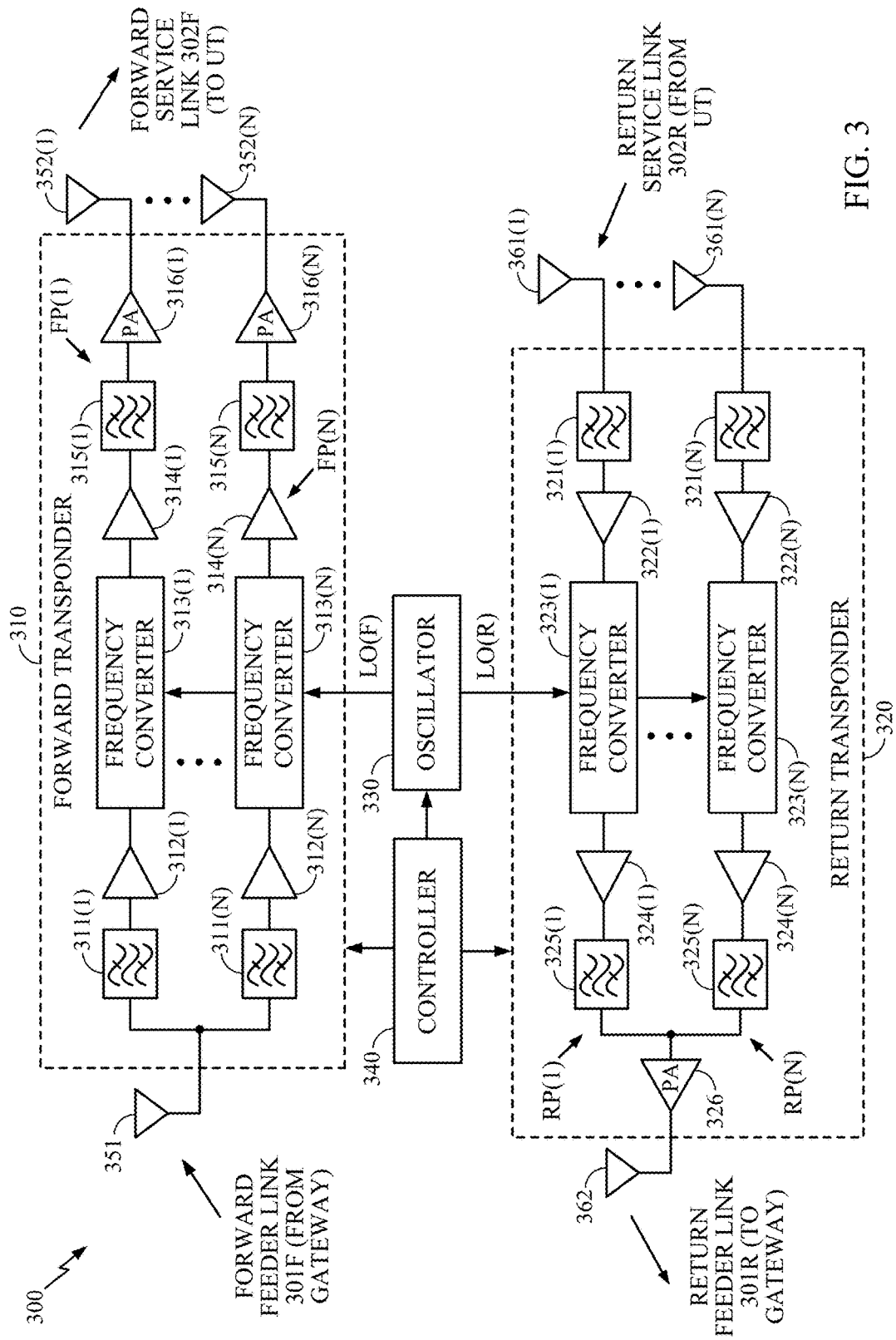
FIG. 3 is a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). In various examples, the processor may be implemented by the processing circuit 1602 illustrated in FIG. 16. The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein.

Figure 4:
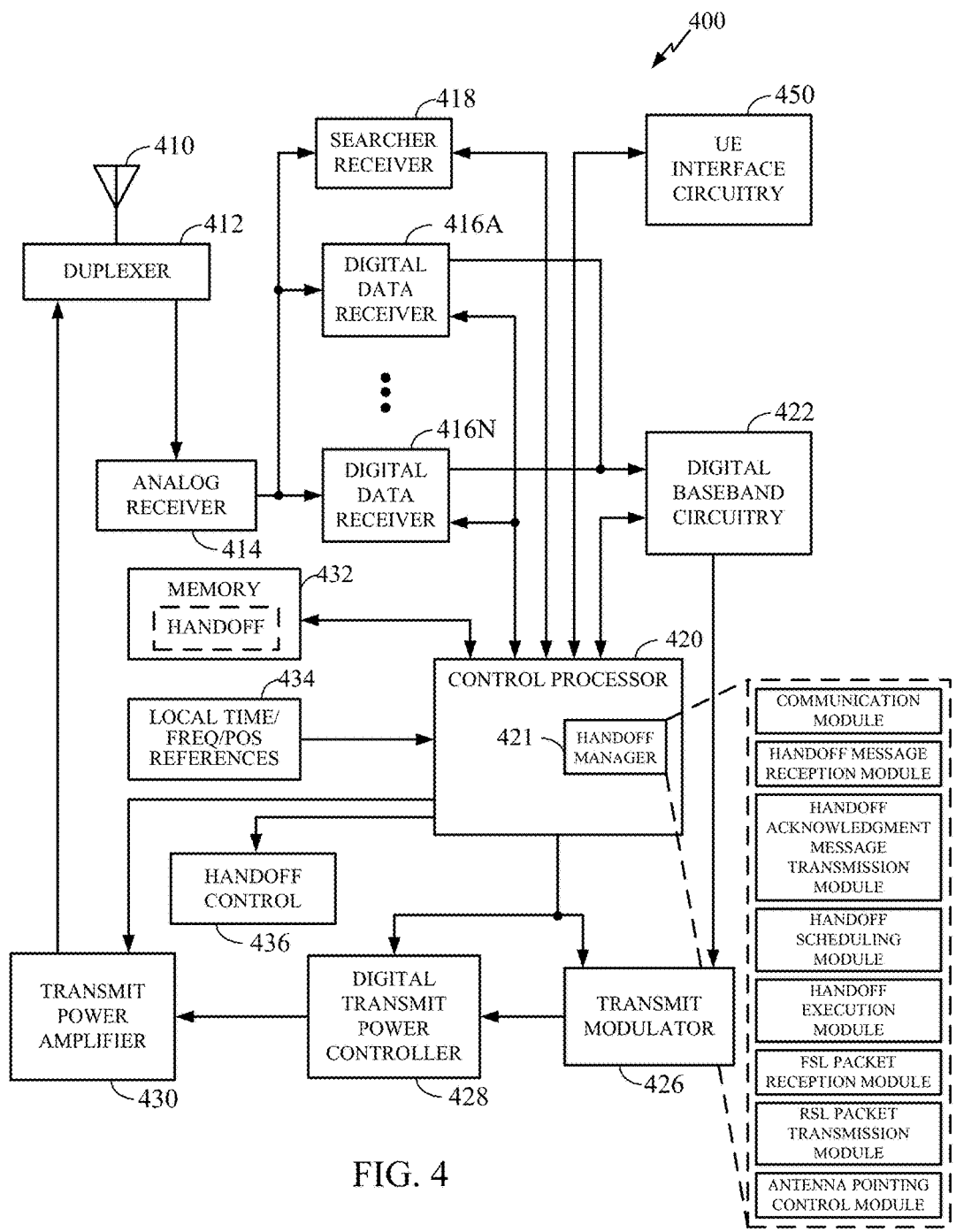
FIG. 4 is a block diagram of one example of the User Terminal of FIG. 1.

An example of certain portions of the UT 400 or 401 is illustrated in FIG. 4. The UT 400 may be configured to perform the handoff method illustrated in FIGS. 8-15, described below. In FIG. 4, at least one antenna 410 is provided for receiving forward link communication signals (e.g., from satellite 300), which are transferred to an analog receiver 414, where they are down-converted, amplified, and digitized. Additional detail of one example of the antenna 410 are provided below and illustrated in FIG. 6. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources. In various examples, the control processor 420 may be implemented by the processing circuit 1602 illustrated in FIG. 16.

In a particular example, the control processor 420 may further include a handoff manager 421 for managing a handoff of the UT 400 from a first satellite to a second satellite. For example, the handoff manager 421 may include a communication module, a handoff message reception module, a handoff acknowledgment message transmission module, a handoff scheduling module, a handoff execution module, an FSL packet reception module, an RSL packet reception module, and an antenna pointing control module.

The handoff manager 421 may be configured via its respective modules to perform a satellite-to-satellite handoff as described herein and illustrated, by way of example, in FIGS. 7-15. For example, the communication module may be configured to communicate with a gateway over forward and/or reverse links, e.g., via the antenna 410. The handoff message reception module may be configured to receive and process a handoff message (e.g., including handoff parameters corresponding to the satellite-to-satellite handoff) from a gateway, transmitted via a satellite. The handoff acknowledgment message transmission module may be configured for generating and transmitting a handoff acknowledgment message to a gateway via a satellite, in response to a received handoff message. The handoff scheduling module may be configured for scheduling the handoff from a first satellite to a second satellite in accordance with the received handoff message. The handoff execution module may be configured for executing the handoff from the first satellite to the second satellite. The FSL packet reception module may be configured for receiving and processing FSL packets, including but not limited to a first FSL packet after the handoff. The RSL packet transmission module may be configured to generate and transmit RSL packets, including but not limited to a first RSL packet before the handoff. The antenna pointing and control module may be configured for controlling the pointing of the antenna 410 and/or one or more feeds within the antenna 410. That is, the antenna 410 may follow or track one or more LEO satellites as they orbit and traverse the sky, and additionally, may repoint from one satellite to another in a handoff procedure. Further, the antenna pointing control circuitry may perform calculations or otherwise determine a direction to point the antenna 410 in accordance with information received from another node in the network, such as parameters in a handoff message received from a gateway 200, information received from a broadcast channel, and/or an ephemeris broadcast.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420. The memory 432 may include a non-transitory computer-readable medium (e.g., one or more nonvolatile memory elements, such as EPROM, EEPROM, Flash memory, a hard drive, etc.) storing instructions that, when executed by the processor, causes the UT 400 to perform operations including (but not limited to) those described herein. In one aspect of the disclosure, the instructions may include handoff code stored in the memory 432 for performing satellite-to-satellite handoff methods and procedures with reduced outages during handoffs as described below and illustrated in FIGS. 8-15. In one example, the UT 400 may include a handoff control block 436 that may be configured by the handoff code to perform functions related to a satellite-to-satellite handoff. For example, the handoff control block 436 may be configured to operate in conjunction with the control processor 420 to compose, receive transmit, and process handoff control messages to or from a gateway via a satellite. Examples of handoff control messages include a received handoff message and a transmitted handoff acknowledgment message. Further, the handoff control block 436 may receive one or more handoff parameters in the handoff message, including suitable information to enable the UT 400 to point its antenna 410 toward a target satellite; a start time or window of time when the UT 400 is to execute the handoff; and/or information of the time and frequency resources to utilize to communicate with the target satellite.

In the example illustrated in FIG. 4, the UT 400 also includes an optional local time, frequency and/or position references 434, which may provide local time, frequency and/or position information to the control processor 420 for various applications, including, for example, time and frequency synchronization for the UT 400. For example, the local time, frequency and/or position references 434 may include a global navigation satellite system (GNSS) receiver, one type of which is the Global Positioning System (GPS).

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas or wired connections, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
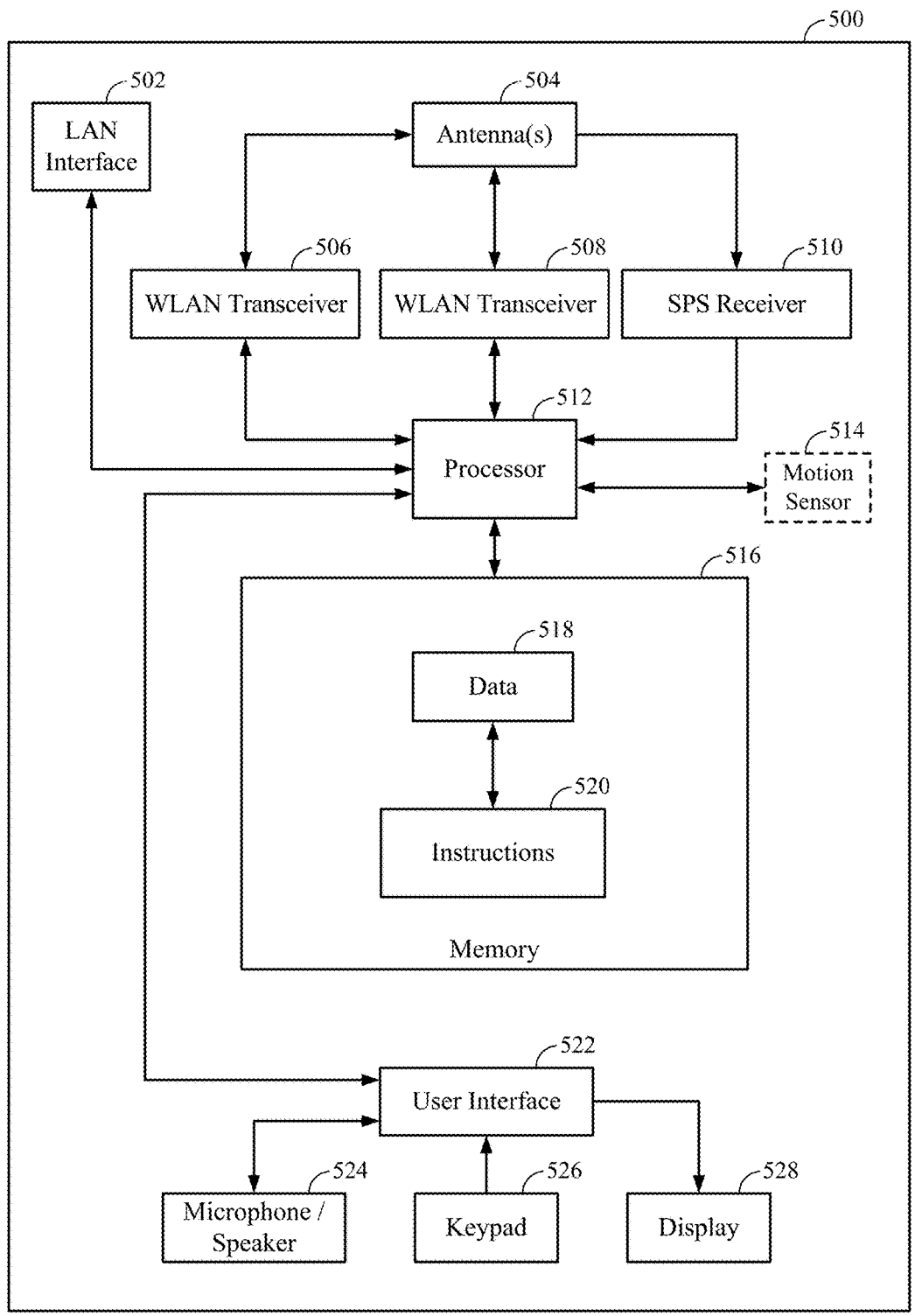
FIG. 5 is a block diagram of one example of the User Equipment of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the one or more global navigation satellite systems (GNSS) such as the Global Positioning System (GPS), the Globalnaya Navigazionnaya Sputnikovaya Sistema (GLONASS), the Galileo positioning system, and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512. In various examples, the processor 512 may be implemented by the processing circuit 1602 illustrated in FIG. 16.

A memory 516 is connected to the processor 512. In one aspect, the memory 516 may include data 518 that may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

The above non-geosynchronous (e.g., LEO) satellite communication system is one option that may be available to provide access to high-speed Internet or other data services in rural or remote areas. That is, particularly when distant from cities or regions of relatively dense population, the deployment of terrestrial cable or fiber networks may not be feasible. Similarly, terrestrial radio access networks, such as Long-Term Evolution (LTE) or other cellular networks, require a backhaul connection to the Internet backbone, which may not be available in these regions.

Internet or data services may be provided to these regions by way of geostationary satellite networks. In these networks, geostationary satellites orbit at a great altitude, that is, 35,800 km, and thus, the propagation delay can be quite substantial. Degradation of the quality of service can thereby result. Another potential disadvantage of these networks is that the number of satellites within the geo-arc is generally limited.

LEO satellite networks, on the other hand, orbit at a relatively low altitude, such as 1200 km, resulting in substantially reduced propagation delay and service degradation compared to geostationary satellite networks. Moreover, the number of satellites in orbit may be much greater than that in a geostationary satellite network. Accordingly, the capacity of a LEO satellite network can be superior to that in geostationary satellite networks.

Handoff procedures are a common concern across the board, in terrestrial radio access networks, geostationary satellite networks, and LEO satellite networks. For example, in terrestrial cellular networks, one serving base station hands off a user equipment to another base station. Satellite networks, whether geostationary or LEO, perform a handoff from one satellite to another. However, due to the particular characteristics of each of these networks, the procedures and algorithms for carrying out the handoff differ.

For example, in a terrestrial radio access network, it generally only takes a few microseconds for control messages to propagate from a base station to a user terminal. With these short propagation times, the time for a handoff of the user equipment from one base station to another is generally dominated by the processing time in the core network. Further, typical handoff protocols in these networks may require several round-trip delays during an interruption between the source cell and the target cell. Moreover, typical handoff protocols in these networks utilize a separate access channel and procedure for the user equipment to gain access to the target cell following the handoff.

In these terrestrial radio access networks, a typical user equipment utilizes a non-directional (e.g., omnidirectional) antenna that allows simultaneous communication with multiple base stations. Thus, there is no need to be concerned with pointing the antenna toward one base station or the other in a handoff. Furthermore, with these non-directional antennas, the time when a handoff occurs may be determined in real time, based on measurements of the signal strengths from nearby base stations. The time when a handoff will occur cannot be predicted by the network, and does not necessarily have any pattern or regularity, and is only based on these signal measurements as the user equipment moves or the channel conditions otherwise change.

Typical LEO satellite telephone systems include user terminals with antennas that can simultaneously receive signals from multiple satellites. Thus, other than the relatively long latency for control signaling (e.g., tens of milliseconds), a handoff procedure for an LEO satellite telephone can be handled similarly to one in a terrestrial cellular network. That is, the signal strength from multiple satellites can be periodically measured and the handoff can depend on the relative signal strength.

In a geostationary satellite communication network, a handoff procedure has many similarities to the handoff in a terrestrial radio access network. One significant difference is that the time for control messages to propagate from a gateway to a user terminal, by way of a geostationary satellite, can be on the order of hundreds of milliseconds.

A broadband LEO satellite system, however, presents its own particular considerations and challenges for a handoff procedure. With reference to FIG. 1, in the present disclosure, the handoff of concern is the handoff of the user terminal (e.g., UT 400) from one satellite 300 to another satellite. It will be understood that the user equipment 500 may also undergo a handoff from one user terminal to another.

In a LEO satellite communication system, the control message propagation time from a gateway 200 to a user terminal 400 by way of an LEO satellite is lower than the geostationary satellite telephone network, but greater than that for terrestrial radio access networks. In a typical LEO network implementation, the user terminal 400 can send and receive signals from any satellite that is 45° or more above the horizon, while the gateway 200 can send and receive signals from any satellite that is 20° or more above the horizon. Given the LEO satellite altitude, these parameters dictate the maximum distance between a user terminal 400 and a gateway 200. At the maximum distance, with the user terminal 400 operating with a slant angle of 45° and the gateway operating with a slant angle of 20°, the total propagation delay between the gateway 200 and the user terminal 400, outside of any processing time at the satellite 300, is approximately 18 ms, and the round trip delay (again ignoring any processing delays at any node) is approximately 36 ms. In the present disclosure, one messaging round-trip delay refers to the time for a message transmission to propagate from a user terminal to a gateway via a satellite, and a message transmission to propagate from the gateway back to the user terminal via a satellite. The messaging round-trip delay may also refer to the time for a message transmission to propagate from a gateway to a user terminal via a satellite, and a message transmission to propagate from the user terminal back to the gateway via a satellite.

In the LEO satellite network, a handoff that is based on signal measurements may be impractical. That is, a user terminal 400 may include a relatively large and directional antenna that may be unwieldy to move rapidly to point at the different satellites, to determine whether a handoff is warranted or not. Duplication of the antenna to allow simultaneous pointing at different satellites is a possible, if costly option. Similarly, a phased array antenna capable of accessing two satellites at the same time is a relatively expensive option. A single-aperture antenna with multiple antenna feeds is known in the field, and while it can reduce the cost relative to duplicated antenna apertures, its cost is still substantial relative to a single-feed, single-aperture antenna.

With the above examples: the duplicated aperture, the phased array, or the multiple-feed antenna, an overlapping or substantially instantaneous handoff procedure may be implemented. Such an overlapping or substantially instantaneous handoff procedure is outside the scope of the present disclosure. However, in a network with some user terminals capable of such overlapping or substantially instantaneous handoff procedures, and others utilizing a handoff procedure as described in detail below, the gateway 200 may maintain a database of which type of handoff each user terminal utilizes. In another example, the type of handoff may be signaled from the user terminal to the gateway 200 as a part of a handoff acknowledgment message, described in further detail below. Throughout the present disclosure, an antenna may be repositioned mechanically, electronically, and/or a combination of both.

Figure 6:
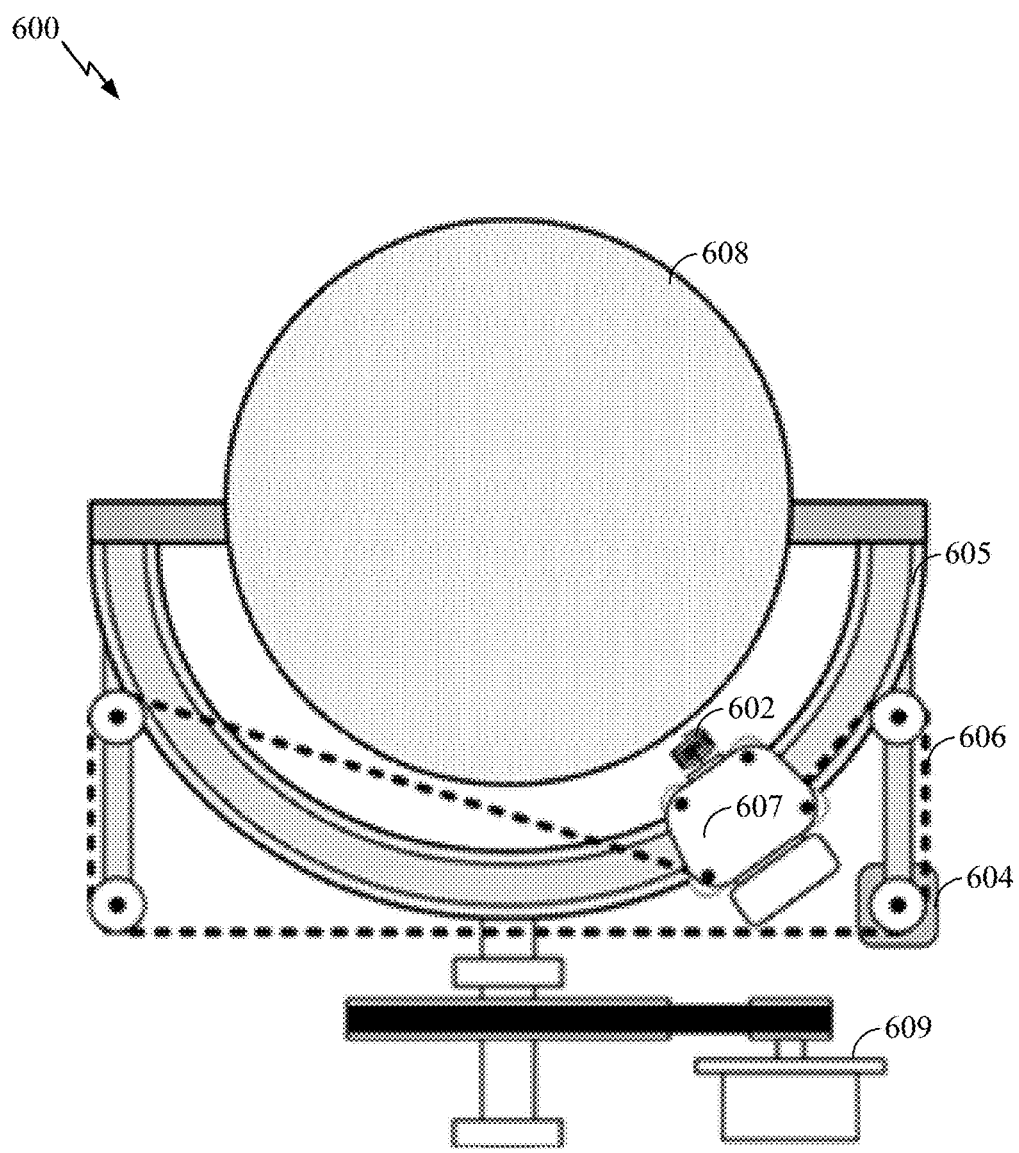
FIG. 6 is a diagram of one example of a mechanically steered antenna that may be employed in the User Terminal of FIG. 4.

To achieve high data rates, as briefly mentioned above, the user terminal 400 may include a directional antenna that can be pointed to a particular satellite in the sky. As one example, a simple Luneburg lens with a single moveable feed and a simple azimuth/elevation mechanism can be used. FIG. 6 is an illustration of one example of a mechanically steered, single feed antenna 600 that may be included in a user terminal 400 as illustrated or described in any of FIGS. 1, 4, 7, 8, 10, 12, and/or 14. In one particular example, the antenna 600 may be utilized as the antenna 410 in the UT 400 illustrated in FIG. 4.

In some examples, the antenna 600 may be a Luneburg antenna including a lens 608. The mechanism for moving the antenna feed 602 to point at a satellite may employ a low-cost stepper motor 604 for driving a flexible toothed belt 606 to drive the antenna feed 602 along a curved track 605, and a stepper motor 609 for rotating the antenna 600 about a vertical axis to an azimuth angle.

The connection between the feed 602 and external electronics may be a cable wrap, i.e., a wire or cable (not illustrated) that extends from the antenna feed housing 607 away from the antenna 600. Cable wraps, while relatively inexpensive, may suffer from a limited range of rotation for the antenna feed. In some circumstances, the antenna feed may be rotated to a new position in the direction to unwrap the cable, which may not be the shortest path to the new position. An alternate option enabling continuous rotation of the antenna 600 is to utilize a rotary joint. However, rotary joints are more expensive than cable wraps, and may have reliability issues.

Unlike the terrestrial radio access network, with a broadband LEO satellite communication network, the time when a handoff from one satellite to another will occur can be predicted. That is, since the orbits of the satellites are known and predictable, handoffs from a setting satellite to a rising satellite can be timed and scheduled, rather than relying on measurements of the instantaneous signal strengths from the satellites. Accordingly, a single antenna aperture and receiver chain, and a single antenna feed, can be used, pointing to a single satellite at a time. The antenna, or antenna feed, can be rapidly moved or re-pointed from the source satellite to the target satellite in a handoff procedure, without necessarily taking any signal measurements or transmitting measurement reports to a gateway.

However, such a handoff procedure in an LEO satellite communication system has particular issues to address. That is, the long propagation delays relative to those in a terrestrial radio access network can cause the handoff process to extend over a long period of time if greater than a necessary number of message interchanges take place. Therefore, the several-round-trip delays for message interchanges in a typical terrestrial radio access network would be unacceptable in the LEO satellite communication system. Additionally, the use of a separate access channel and procedure to gain access to the target satellite could lead to an unacceptably long handoff interruption. While the orbits of the satellites may be known and predictable, the geometry of the satellites' orbits may vary relative to one another, making each handoff potentially different from the next. The cable unwrap cycle, if a cable wrap is used, may be needed in a particular handoff, increasing the time to re-point the antenna from one satellite to the next. With these variables, the total time for a handoff may vary widely, e.g., from a few hundred milliseconds, to well over a second. However, in all handoffs, it is desired to reduce or minimize the duration of any disconnection of a data link during the satellite-to-satellite handoff procedure.

One known algorithm for beam-to-beam-of-a-single-satellite handovers reduces call dropping rates in a multi-beam communication system, such as an LEO satellite communication system. In this known algorithm, a messaging protocol is implemented between the gateway and the user terminal. Based on messages sent from the user terminal to the gateway, the gateway can determine the more desirable beam(s) for transmitting data or information to the user terminal. Further, a known algorithm for satellite-to-satellite handovers discloses a satellite communications system in which one or more subscriber terminals in the satellite's coverage area may be transitioned to another communication service by transmitting a control signal to the subscriber terminals. Here, the control signal may directly cause the identified subscriber terminal to electronically repoint one or more antennas associated with the subscriber terminal to align the antennas with a position of a second satellite. However, neither of these algorithms provide for the satellite-to-satellite handoff characterized herein, where a UT determines its internal schedule for a handoff based on handoff parameters received at an earlier time.

Accordingly, various aspects of the present disclosure provide a handoff procedure that can reduce or minimize the number of control message interactions, while accommodating a wide range of antenna movement times.

As described in further detail below, the present disclosure provides for procedures and protocols for satellite-to-satellite handoffs, which may be referred to as a handoff from a source satellite to a target satellite. In some examples, both the source satellite and the target satellite are in communication with the same gateway; while in other examples, the source satellite and the target satellite are in communication with different gateways.

Figure 7:
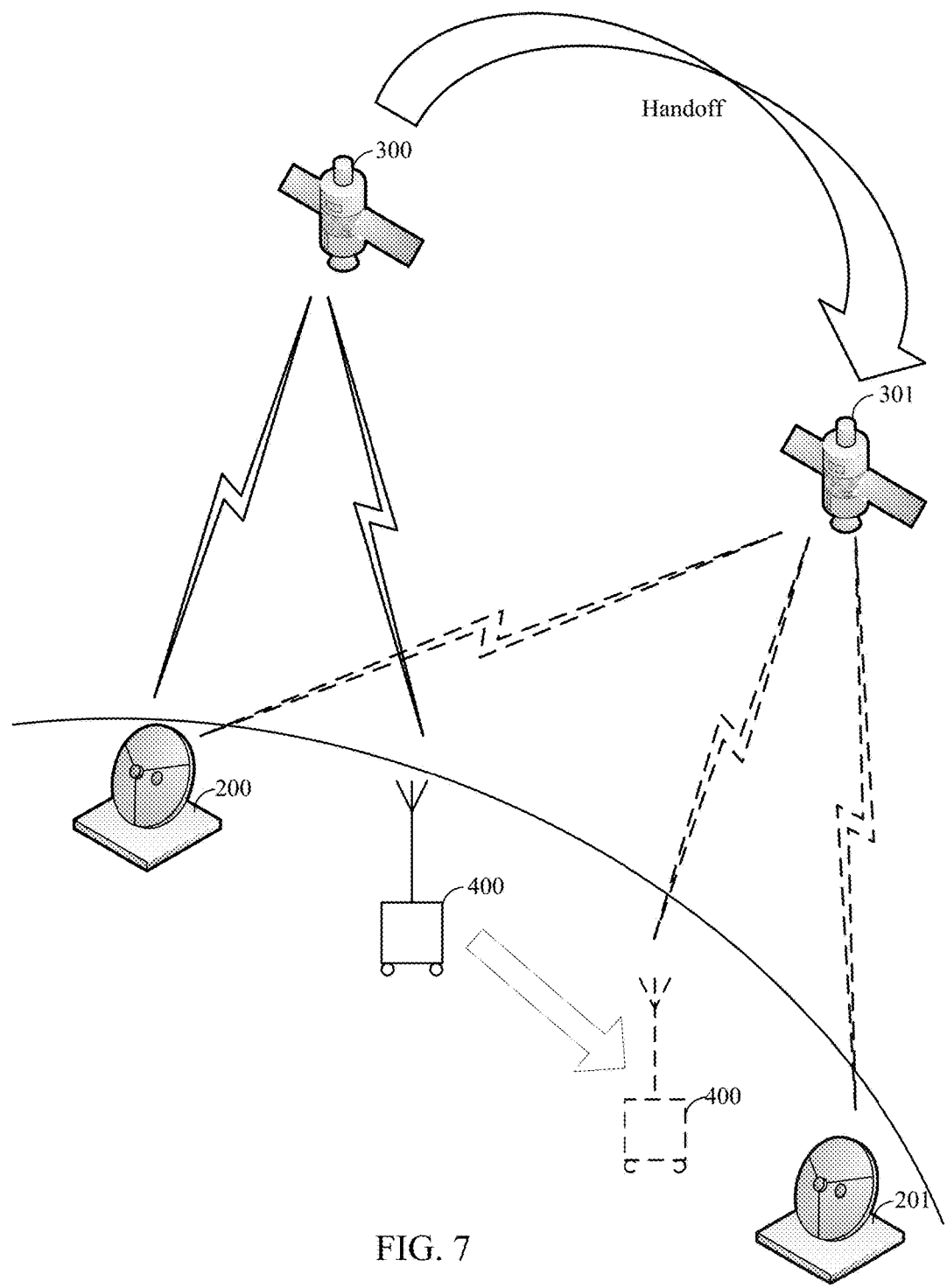
FIG. 7 is a diagram illustrating a handoff scenario involving a UT, one or more gateways, and two satellites in accordance with an aspect of the disclosure.

FIG. 7 is a schematic diagram illustrating a handoff scenario involving a UT 400, one or more gateways 200/201, and two satellites 300/301 in accordance with an aspect of the disclosure. A UT 400 may be initially in communication with a gateway 200 via a first satellite 300 (the source satellite) in a LEO satellite communications system. As part of this communication, the gateway 200 may schedule and allocate time and frequency resources for both the forward link and the return link.

The time for each of the nodes in the system may be an absolute time, such as a time derived from GPS signals. In another example, the system time may be a time relative to data frame boundaries inherent in the data streams. The gateway 200 may configure suitable timing or delays for transmissions to the respective satellites 300/301 so that the arrival of the signals at the UT 400 may be controlled. In one example, the timing of the signals may be aligned at the UT 400 or at the satellite 300. Where the time is aligned at the satellite 300, each transmitter may compensate time so that the signals will arrive at the satellite 300 at the system reference time. In another example, a fixed time offset may be communicated to, or known by the UE 400.

As the first satellite 300 orbits and exits the range of the UT 400 and/or the gateway 200, the gateway 200 and/or the UT 400 can cease being able to communicate with each other via the first satellite 300. (In some cases, rather than the movement of the satellite 300 causing need for the handoff, the UT 400 may move away from the communication range of the first satellite 300.) Therefore, the UT 400 in a handoff procedure may switch to communicate with a second satellite 301 (the target satellite) in order to maintain communication. After the handoff, the UT 400 may maintain communication with the same gateway 200 or a different gateway 201. The UT, gateways, and satellites of FIG. 7 may be the same as any of the UTs, gateways, and satellites illustrated or described in FIGS. 1-4, 8, 10, 12, and/or 14.

Below are described four exemplary procedures for a satellite-to-satellite handoff according to various aspects of the disclosure. In a first example and in a second example, after repointing to the target satellite, the UT 400 may immediately begin transmitting the return link. In the first example, illustrated in FIG. 8, both the source satellite and the target satellite are in communication with the same gateway; and in the second example, illustrated in FIGS. 10-11, the source satellite is in communication with a first gateway, and the target satellite is in communication with a second gateway. In a third example and in a fourth example, after repointing to the target satellite, the UT 400 may wait until it receives the first forward link packet from the target satellite before it begins transmission of the return link. In the third example, illustrated in FIGS. 12-13, both the source satellite and the target satellite are in communication with the same gateway; and in the fourth example, illustrated in FIGS. 14-15, the source satellite is in communication with a first gateway, and the target satellite is in communication with a second gateway.

Figure 8:
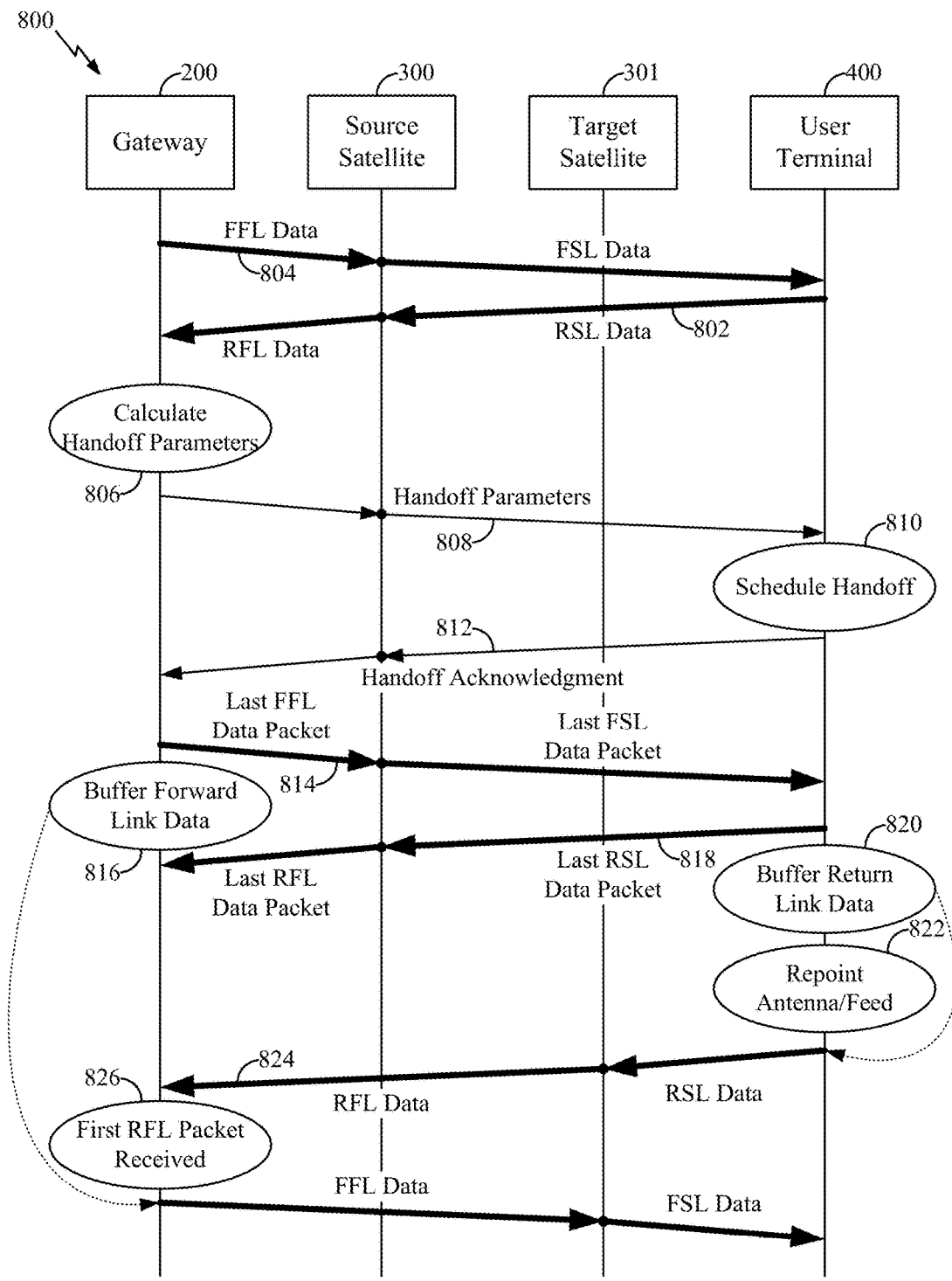
FIG. 8 is a call flow diagram illustrating a first example of a satellite-to-satellite handoff procedure according to an aspect of the disclosure.

Referring now to FIG. 8, a call flow diagram illustrates an exemplary satellite-to-satellite handoff procedure 800 corresponding to the first example described above. As illustrated, the satellite-to-satellite handoff procedure 800 may be performed by the gateway 200, the source satellite 300, the target satellite 301, and the user terminal 400 described above, and illustrated, for example, in FIGS. 1, 2, 3, 4, 7, 10, 12, and/or 14.

As illustrated in FIG. 8, the UT 400 may initially communicate with a gateway 200 via a first satellite (source satellite) 300. For example, the UT 400 may be transmitting RSL data 802 to the gateway via the first satellite 300, and/or receiving FSL data, which corresponds to FFL data 804 from the gateway 200 via the first satellite 300. As described in relation to FIG. 1, the gateway 200 may transmit data packets to the UT 400 via a FFL (between the gateway 200 and a satellite 300) and a FSL (between the satellite 300 and the UT 400). Similarly, the UT 400 may transmit data packets to the gateway 200 via a RSL (between the UT 400 and a satellite 300) and a RFL (between the satellite 300 and the gateway 200). In the following discussion of the handoff protocol 800, when a FSL data packet transmission is made from the satellite 300, it is assumed that a corresponding FFL data packet is transmitted by the gateway 200 to the satellite 300, which forwards such data packet to the UT 400 as the FSL data packet. Similarly, when a RSL data packet transmission is made from the UT 400, it is assumed that such data packet is transmitted to the satellite 300, and a corresponding RFL data packet is transmitted by the satellite 300 to the gateway 200.

At a suitable time, which may be a predetermined time, or may be triggered by any event, at time 806 the gateway 200 may calculate various handoff parameters for a satellite-to-satellite handoff of the UT 400. The gateway 200 may then transmit these handoff parameters to the UT 400 in a handoff message 808 via the first satellite 300.

In one example, the handoff parameters may be explicitly provided in a unicast handoff message 808. In another example, the handoff parameters may be disseminated via a broadcast channel that informs all (or a plurality of) user terminals about the satellites or repointing information.

The handoff message 808 may include any suitable information or parameters for enabling the UT 400 to point at the target satellite 301. For example, the handoff parameters may enable the UT 400 to determine when to undertake the satellite-to-satellite handoff, and to determine which satellite to handoff to, or at least how to point at the next satellite.

For example, the handoff message 808 may include ephemeris information, e.g., information providing the positions of one or more satellites at given times. In another example, the handoff message 808 may include angle or geometry information configured to enable the UT 400 to repoint its antenna/feed at a suitable angle, without necessarily having any visibility or knowledge of the actual positions of the satellites. In yet another example, the handoff message 808 may include a set of points or angles, configured such that the UT 400 may determine the azimuth and elevation of the satellite for the repointing of the antenna/feed at the time of the handoff.

The handoff message 808 may further include timing information for the handoff. Here, the timing of the handoff may correspond to an absolute time or a data frame relative time. As indicated above, an absolute time may be derived from any suitable source, including but not limited to GPS transmissions. In other examples, data frame relative timing may be utilized. Data is transmitted in blocks of time called data frames. A data frame may include a single data packet or several data packets. Data packets may be user data or control data. Data frames may be numbered sequentially to enable tracking of missing data or as a simple way to keep track of system time. In one example, a numbering system starts with frame zero at midnight and numbers the frames sequentially throughout the day. Another example of a numbering system numbers the data frames sequentially until a maximum number (e.g., 255 using an eight bit number) and then starts over at zero. In one example, data frame relative time is the time that a data frame N is transmitted or received to some other frames in the sequence. For example, a data frame N–3 is transmitted 3 frame periods before a data frame N.

The timing information for the handoff time may in some examples be a start time for the handoff, or a window of time when the UT 400 is to execute the handoff. When the handoff timing information corresponds to a time window, e.g., an absolute time window or a data frame relative time window, the UT 400 may utilize the window as additional time to complete transmission of a block or frame of scheduled data if it is in progress before suspending the transmission for the handoff.

In some examples, the timing information may inform the UT 400 to look for a forward link packet with an indicator that the packet is the last forward link packet to be sent via the first satellite 300. Additional discussion of this indicator is provided below.

The handoff message 808 may further include information respecting the time and frequency resources reserved for the UT 400 to utilize for transmission to the second satellite 301 following the handoff, so that the flow of return link data may quickly resume following the handoff, with or without additional control messages after re-pointing the antenna. Time and frequency resources are resources capable of supporting data transmission to or from the UT 400 via the satellite (e.g., the source satellite 300 and the target satellite 301). The information about the time and frequency resources may be explicitly communicated to the UT 400 in the handoff message 808, or communicated implicitly, e.g., utilizing an index to a table that is known both to the gateway 200 and the UT 400. In another example, the information about the time and frequency resources may be communicated to the UT 400 utilizing a bitmap carried on the handoff message 808.

The time and frequency resources may be continuous or discontinuous. If discontinuous, the resources may be shared with other UTs (or other users) in the times and/or frequencies not allocated to the UT 400. For example, during the time that the UT 400 is repointing the antenna, the time and frequency resources may in some examples be made available for other user terminals, except for the resources held available for transmitting the first return link packet following the handoff. In some examples, the pattern of discontinuity may be configured to expedite or maximize a fast handoff for more capable user terminals, and to reduce the amount of time and frequency resources wasted by slower or less-capable user terminals. Further, the pattern of any discontinuity may be configured to make more resources available when it is most likely for the UT 400 to transmit the first return link packet through the target satellite 301 following the handoff. Still further, the pattern of a discontinuity may be configured to provide more frequent return link transmission opportunities to accommodate user terminals with fast antennas (e.g., fast repointing speeds), or less frequent return link transmission opportunities to accommodate user terminals with slower antennas (e.g., slower repointing speeds) or otherwise when the interruption to repoint the antenna takes longer.

Accordingly, unlike the signaling in a terrestrial radio access network, the UT may not utilize a random access channel to gain access to time and frequency communication resource assignments via the target satellite, unless the handoff fails and the UT goes to a recovery mode.

In a further aspect of the disclosure, the handoff message 808 may include information respecting a beam-to-beam handoff. That is, an LEO satellite may transmit a plurality of beams to the ground. At any given time, the UT 400 may be assigned to a particular one of these beams. As the satellite traverses the sky, the antenna at the UT 400 may track the satellite, and may handoff from one beam to another over time. Thus, the handoff parameters in the handoff message 808 may include information regarding these beam-to-beam handoffs as well as the satellite-to-satellite handoff information described above.

In various examples the handoff message 808 may provide information respective of one or more handoffs, or information that the UT 400 may utilize to predict or schedule one or more handoffs.

In accordance with the handoff message 808, at 810 the UT 400 may set its internal schedule for the handoff. That is, the handoff message 808 may be configured to enable the UT 400 to predict the handoff at a time before the handoff occurs. The scheduled handoff may take place at a later time, after the scheduling of the handoff.

In some examples, the UT 400 may calculate a satellite position based on ephemeris information in the handoff message 808 or in one or more broadcast messages, to guide the pointing of the antenna/feed to intercept the target satellite 301 following the handoff. In some examples, the UT 400 may calculate a direction to point the antenna/feed based on information in the handoff message 808 or in one or more broadcast messages, without requiring any direct knowledge of the actual position of the target satellite 301.

When the UT 400 has set its internal schedule for the handoff, the UT 400 may transmit a handoff acknowledgment message (ACK) 812. In this way, the UT 400 may inform the gateway 200 that the UT 400 has received the handoff message 808, and may indicate that the UT 400 will proceed with the handoff.

In some aspects, the ACK message may include the UT's estimate of the time required to repoint its antenna/feed to the target satellite 301. Here, this estimate may be based on the distance that its azimuth and elevation positioners are to be moved from pointing to the source satellite, to pointing to the target satellite. The estimate may additionally or alternatively be based on the route for making the movement or repointing of the antenna/feed, including any cable unwrap movement if needed for a particular handoff. The gateway 200 may utilize the estimate to free the return link time and frequency resources reserved for the UT 400 during the handoff, and to allow other UTs or users to use these resources until the expiration of the estimated move time.

As indicated above, the execution of the handoff itself may be scheduled for any suitable time, and may in various examples be a short time or a relatively long time subsequent to the transmission of the ACK message 812. That is, in some aspects of the disclosure, the gateway 200 and the UT 400 may have additional data exchanges between the handoff message 808 and the last RSL/FSL packet transmissions (discussed below) in addition to those shown in FIG. 8. Thus, after a potential delay, the time for the handoff may transpire. Of course, in some examples, the time for the handoff may occur immediately upon transmission of the ACK message 812. That is, in various aspects of the disclosure the ACK message 812 may act as a trigger to begin the handoff, or may provide information to the gateway 200 regarding a handoff scheduled at some time in the future.

As the time for the handoff arrives, the gateway 200 may transmit the last forward link packet 814 to the user terminal 400 via the source satellite 300. In one aspect of the disclosure, the last forward link packet 814 is the last forward link packet received by the UT 400 before it repositions its antenna to the second satellite 301. As indicated above, the UT 400 may be informed of the arrival of the last forward link packet 814 in any of a number of ways: such as by a schedule included in the handoff message 808; by signaling, e.g., broadcast signaling, which may be transmitted at or near the time of the last forward link packet 814; and/or by an indicator embedded in the last forward link packet 814. When the last forward link packet 814 includes such a last packet indicator, the indicator may be provided in any suitable manner adapted to identify the last forward link packet to be transmitted to the UT 400 via the source satellite 300. For example, the last packet indicator may be explicit in the protocol of the packet frame for forward link packets. In another example, the indicator may be a reserved sequence number or frame number. Here, the reserved sequence number or frame number may be employed in the last forward link packet 814 to indicate that this packet is the last packet. In another example, the last packet indicator may be provided by the inversion of a cyclic redundancy check (CRC) portion of the last packet 814. In this example, the UT 400 may try both the non-inverted CRC and the inverted CRC when decoding packets, so that it may determine that the inverted CRC has been used for a particular packet. In some examples, the indication of the last forward link packet may be a single bit that may be communicated by any protocol capable of communicating a single bit.

In any example where a last packet indicator is utilized, such an indicator may be useful for upper layers at the UT 400. For example, applications running at the UT 400 may understand the indicator as a signal to hold off or suspend communication until the handoff completes.

In some aspects of the disclosure, the transmission of the last forward link packet 814 may be optional. That is, it may occur that forward link transmissions may not happen to be taking place at the time of the handoff. In some aspects of the disclosure, any of the forward link or return link packets after the handoff message, including the last forward link packet 814, may fail or may be omitted, and the UT 400 may nevertheless proceed to reposition its antenna at the scheduled time. That is, in such examples, the handoff may continue as scheduled in accordance with the handoff message 808, even without such a last forward link packet 814. When a last forward link packet is transmitted, the packet may be any suitable format or category of packet, including a data packet or a control packet.

Following the transmission of the last forward link packet (if such transmission occurs), the gateway 200 may terminate or suspend the forward link, and at 816, may begin buffering user data intended for forward link transmission, until the handoff is complete. For example, with reference to FIG. 2, the gateway 200 may temporarily store user data for the forward link in a buffer, e.g., in the memory 252.

When the UT 400 receives the last forward link packet 814, and/or when the time for the scheduled handoff transpires, the UT 400 may begin to commence the handoff. For example, the UT 400 may transmit the last return link packet 818 to the gateway 200 via the source satellite 300. Here, the last return link packet 818 may include user data, control signaling, or any suitable type or category of packet. In some examples, the last return link packet 818 may include an acknowledgment (ACK) of the last forward link packet 814. In other examples, an ACK for the last forward link packet 814 may be transmitted from the UT 400 at a later time, such as following the resumption of the return link after the handoff is complete. In some examples, the transmission of the last return link packet 818 may be optional. That is, it may occur that return link transmissions may not happen to be taking place at the time of the handoff. In such an example, the handoff may continue as scheduled in accordance with the handoff message 808, even without such a last return link packet 818.

In some aspects of the disclosure, the gateway and the UT may have additional data exchanges between the handoff message and the last forward link/return link packet transmissions in addition to those shown in FIG. 8. For example, these data exchanges may include ACK and NAK responses and appropriate corrective actions, etc.

Following transmission of the last return link packet 818 (if such transmission occurs), the UT 400 may terminate or suspend the return link, and at 820, may begin buffering user data intended for return link transmission, until the handoff is complete. For example, with reference to FIG. 4, the UT 400 may temporarily store user data for the return link in a buffer, e.g., in the memory 432.

Further, following transmission of the last return link packet 818 (if such transmission occurs), at 822 the UT 400 may repoint the antenna or feed to point to the target satellite 301 in accordance with the handoff. Here, in an aspect of the disclosure, the UT 400 may immediately (or as soon as possible, or after a suitable delay) begin the repointing of the antenna or feed after the completion of the transmission of the last return link packet 818, with or without additional control messages after repointing the antenna. In an example where no last return link packet is transmitted, the UT 400 may immediately begin the repointing of the antenna or feed at the time scheduled for the handoff according to the handoff message 808. As discussed above, repointing the antenna or feed may involve moving a feed 602 (see FIG. 6), moving an antenna, or repointing a beam (e.g., with a phased array antenna), depending on the nature of the antenna in the UT 400. In some examples, if a cable wrap is used in the UT 400, repointing the antenna may also include a cable unwrap cycle, as described above.

In some aspects of the disclosure, other scenarios of data exchanges between the UT 400 and the gateway 200 may occur after the handoff ACK message 812 and before the UT 400 repoints its antenna. For example, these data exchanges may include ACK and NACK responses and appropriate corrective actions if the time between scheduling the handoff and starting to move the antenna allows.

Once the repointing of the antenna/feed is complete, the UT 400 may begin transmission of the return link, including any buffered return link data, to the gateway 200 via the target satellite 301. Here, the time to begin the return link transmission may correspond to the completion of the moving of the antenna or feed. Further, the transmission may utilize at least a portion of the time and frequency resources reserved for the transmission through the target satellite 301 and indicated to the UT 400 in the handoff message 808.

At this time, the gateway 200 may be monitoring the reserved time and frequency resources for return link transmissions from the UT 400 via the target satellite 301, and may accordingly, at 826, receive the first return link packet 824 from the UT 400 via the target satellite 301.

In an aspect of the disclosure, the gateway 200 may recognize the reception of the first return link packet 824 from the UT 400 via the target satellite 301 as a confirmation of a successful handoff, indicating that the handoff is complete and that the transmission of the forward link may resume. Accordingly, upon reception of the first return link packet 824 from the UT 400 via the target satellite 301, the gateway 200 may begin transmission of the forward link, including any buffered forward link data, to the UT 400 via the target satellite 301.

Figure 9:
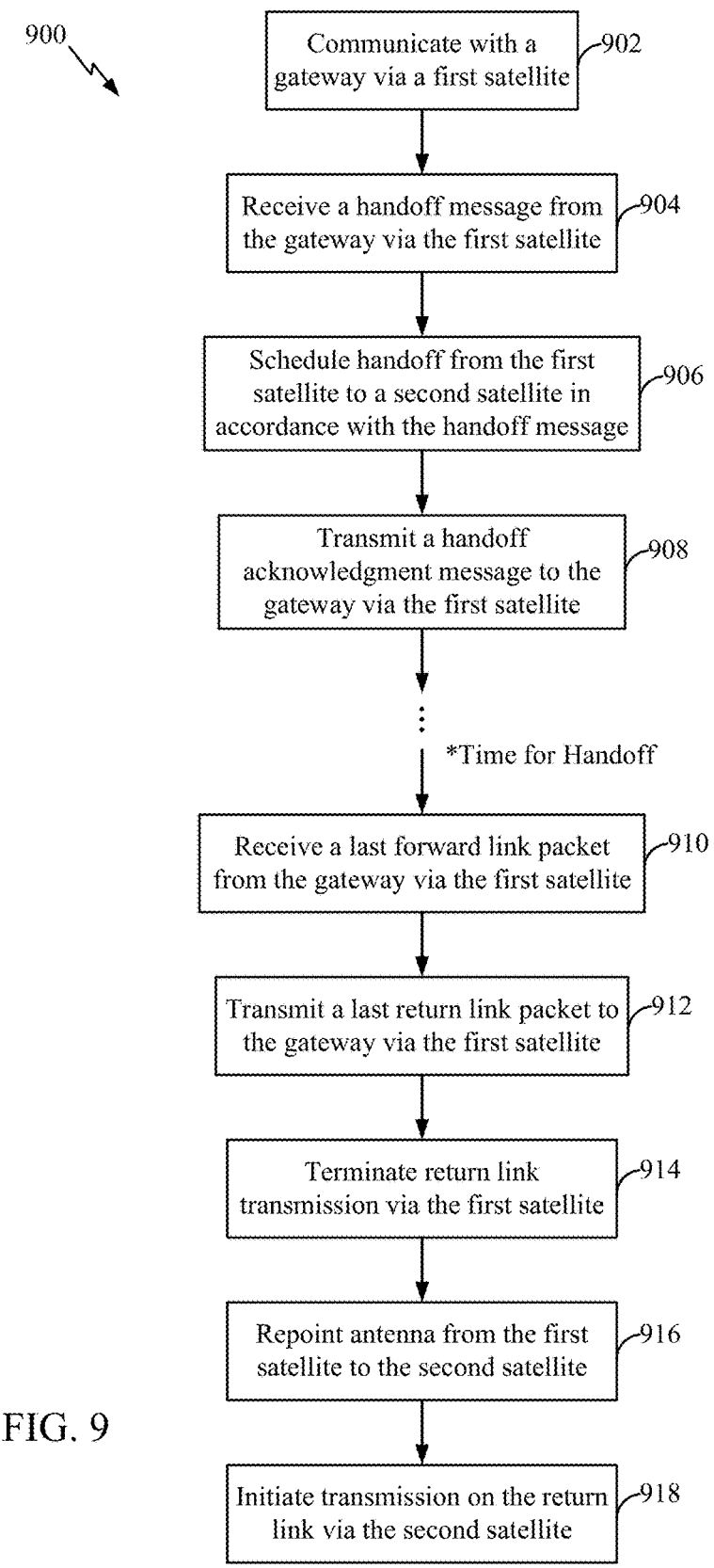
FIG. 9 is a flow chart further illustrating the satellite-to-satellite handoff procedure illustrated in FIG. 8.

FIG. 9 is a flow chart illustrating an exemplary process 900 for a satellite-to-satellite handoff according to some aspects of the disclosure, e.g., corresponding to the call flow diagram of FIG. 8. The handoff process 900 may be performed by a UT illustrated in any of FIGS. 1, 4, 7, 8, 10, 12, and/or 14. In one particular example, the UT may be the UT 400 illustrated in FIG. 4, equipped with an antenna similar to the antenna 600 illustrated in FIG. 6.

At block 902, the UT 400 may communicate with a gateway (e.g., the gateway 200) via a first satellite (e.g., the satellite 300). For example, a forward link may flow from the gateway to the UT via the first satellite, and a return link may flow from the UT to the gateway via the first satellite.

At block 904, the UT 400 may receive a handoff message from the gateway, via the first satellite. Here, the handoff message may include information sufficient for the UT 400 to identify a target satellite, and to determine a time for a handoff from the first satellite to the target satellite. That is, the handoff message may identify a second satellite as a target satellite for the handoff, or may include suitable parameters to enable the UT 400 to repoint its antenna toward the second satellite.

At block 906, the UT 400 may schedule the handoff from the first satellite to the second satellite in accordance with the handoff message. Here, the handoff may be scheduled at a later time, e.g., corresponding to the orbital patterns of LEO satellites in the LEO satellite communication network. In some examples, scheduling the handoff may include determining a direction for pointing the antenna at the UT 400 to the second satellite based on at least one of information contained in the handoff message, information received from a broadcast channel, or ephemeris broadcast.

At block 908, in response to handoff message, the UT 400 may transmit a handoff acknowledgment message to the gateway via the first satellite. In some examples, the handoff acknowledgment message may include a projected time for repointing the antenna to the second satellite.

As illustrated in FIG. 9, some time may pass following the transmission of the handoff acknowledgment message. That is, the transmission of the handoff acknowledgment message may be made at a time independent of an actual handoff taking place. Here, the time for the handoff, as indicated in the handoff message, may correspond to the orbital pattern of the satellites.

At block 910, the UT 400 may receive a last forward link packet from the gateway via the first satellite. In some examples, the last forward link packet may be identified as being the last forward link packet, e.g., by at least one of a schedule or frame number included in the handoff message, a signaling message received from the gateway, and/or an indication embedded in the last forward link packet.

At block 912, the UT 400 may transmit a last return link packet to the gateway via the first satellite. Following the transmission of the last return link packet, the UT 400 may execute the handoff from the first satellite to the second satellite. That is, at block 914 the UT 400 may terminate or suspend the return link transmission via the first satellite, and may begin buffering return link data for the duration of the repointing of the antenna. Thus, at block 916, the UT 400 may repoint the antenna from the first satellite to the second satellite, and at block 918, may initiate transmission on the return link via the second satellite.

As described above, in an aspect of the disclosure, the UT 400 may receive no handoff control packets from the gateway during a time period between the last forward link packet transmission and the first forward link packet transmission. Here, handoff control packets refers to packets relating to the handoff, and it is to be understood that other signaling may take place, such as reference signals that may be used by the UT to make channel estimates before its return link transmission.

Figure 10:
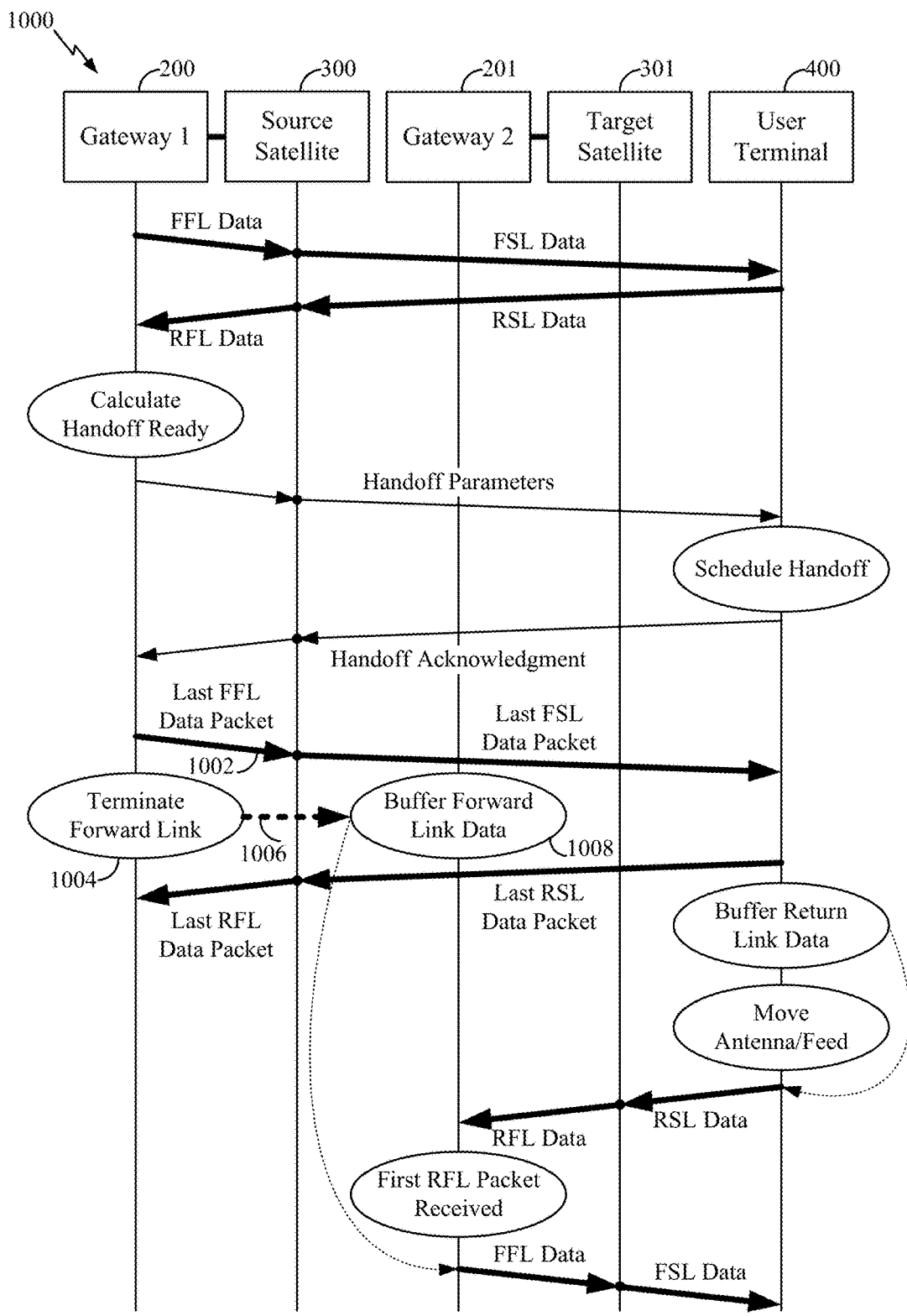
FIG. 10 is a call flow diagram illustrating a second example of a satellite-to-satellite handoff procedure according to an aspect of the disclosure.

FIG. 10 is a call flow diagram illustrating a second exemplary satellite-to-satellite handoff procedure 1000 as described above. As illustrated, the satellite-to-satellite handoff procedure 1000 may be performed by a first gateway 200, a second gateway 201, a source satellite 300, a target satellite 301, and the user terminal 400 described above, and illustrated, for example, in FIGS. 1, 2, 3, 4, 7, 8, 12, and/or 14.

In this example, while most of the procedures are the same or similar to those described above and illustrated in FIG. 8, here, the source satellite 300 is in communication with the first gateway 200, and the target satellite 301 is in communication with the second gateway 201. Because most of the steps and actions in the procedure 1000 are the same or similar to those in procedure 800, for the sake of brevity, those actions are not described herein.

In this example, at the time of the scheduled handoff, the first gateway 200 may transmit a last forward link packet 1002 to the UT 400 via the source satellite 300. Following the transmission of the last forward link packet (if such transmission occurs), at 1004 the first gateway 200 may terminate or suspend the forward link.

In an aspect of the disclosure, following transmission of the last forward link packet 1002, at 1004 the first gateway 200 may terminate the flow corresponding to the forward link. That is, because in this example, the UT 400 is being handed off to a target satellite 301 that is in communication with a different gateway, the first gateway 200 may end the communication session and commence with other activities. In some examples, after transmission of the last forward link packet 1002, the first gateway may still have, e.g., stored in a transmission buffer, one or more packets for the UT 400 that were not transmitted in the forward link flow. In still another example, following the transmission of the last forward link packet 1002, one or more packets for the UT 400 may be sent to the first gateway 200.

In any of these cases, some examples may simply discard these packets after transmission of the last forward link packet 1002. In other examples, however, a communication link between the first gateway 200 and the second gateway 201 may exist. For example, as illustrated in FIG. 1, both gateways 200 and 201 may be connected to network infrastructure 106, and may accordingly be capable of exchanging packets with one another. Thus, following transmission of the last forward link packet 1002, at 1006 the first gateway 200 may forward or transfer any packets for the UT 400 to the second gateway 201.

Furthermore, following the transmission of the last forward link packet 1002, suitable signaling and communication may take place to indicate to the infrastructure 106 that the second gateway 201 will be the node from which forward link data will be transmitted to the UT 400. Thus, at this point, at 1008 the second gateway 201 may begin to buffer any forward link data that it may receive from the infrastructure 106 until the handoff is complete. The remainder of the handoff procedure 1000 is substantially the same as the first example described above and illustrated in FIG. 8.

Figure 11:
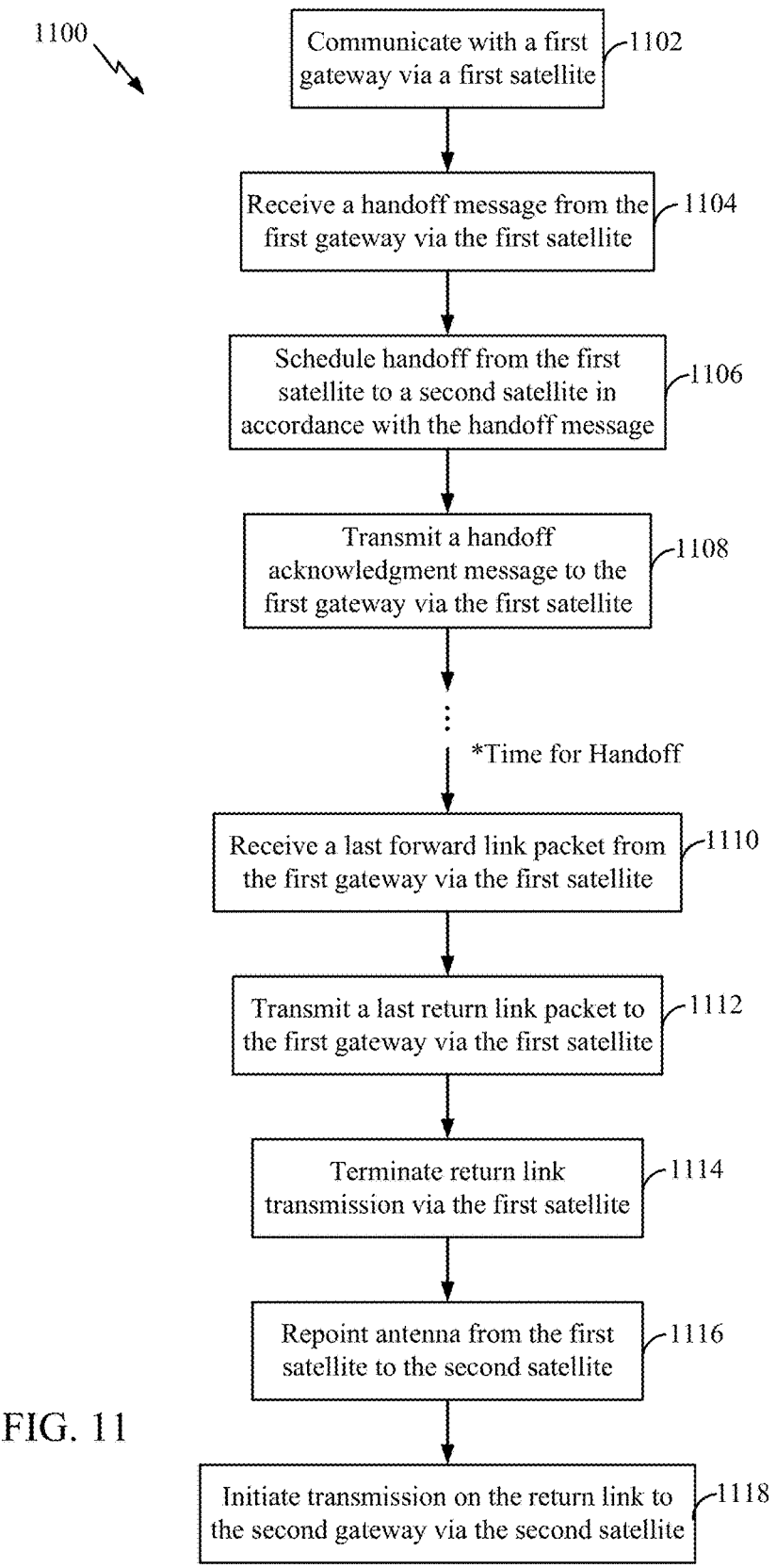
FIG. 11 is a flow chart further illustrating the satellite-to-satellite handoff procedure illustrated in FIG. 10.

FIG. 11 is a flow chart illustrating an exemplary process 1100 for a satellite-to-satellite handoff according to some aspects of the disclosure, e.g., corresponding to the call flow diagram of FIG. 10. The handoff process 1100 may be performed by a UT illustrated in any of FIGS. 1, 4, 7, 8, 10, 12, and/or 14. In one particular example, the UT may be the UT 400 illustrated in FIG. 4, equipped with an antenna similar to the antenna 600 illustrated in FIG. 6.

At block 1102, the UT 400 may communicate with a first gateway (e.g., the gateway 200) via a first satellite (e.g., the satellite 300). For example, a forward link may flow from the first gateway to the UT via the first satellite, and a return link may flow from the UT to the first gateway via the first satellite.

At block 1104, the UT 400 may receive a handoff message from the first gateway, via the first satellite. Here, the handoff message may include information sufficient for the UT 400 to identify a target satellite, and to determine a time for a handoff from the first satellite to the target satellite. That is, the handoff message may identify a second satellite as a target satellite for the handoff, or may include suitable parameters to enable the UT 400 to repoint its antenna toward the second satellite.

At block 1106, the UT 400 may schedule the handoff from the first satellite to the second satellite in accordance with the handoff message. Here, the handoff may be scheduled at a later time, e.g., corresponding to the orbital patterns of LEO satellites in the LEO satellite communication network. In some examples, scheduling the handoff may include determining a direction for pointing the antenna at the UT 400 to the second satellite based on at least one of information contained in the handoff message, information received from a broadcast channel, or ephemeris broadcast.

At block 1108, in response to handoff message, the UT 400 may transmit a handoff acknowledgment message to the first gateway via the first satellite. In some examples, the handoff acknowledgment message may include a projected time for repointing the antenna to the second satellite.

As illustrated in FIG. 11, some time may pass following the transmission of the handoff acknowledgment message. That is, the transmission of the handoff acknowledgment message may be made at a time independent of an actual handoff taking place. Here, the time for the handoff, as indicated in the handoff message, may correspond to the orbital pattern of the satellites.

At block 1110, the UT 400 may receive a last forward link packet from the first gateway via the first satellite. In some examples, the last forward link packet may be identified as being the last forward link packet, e.g., by at least one of a schedule or frame number included in the handoff message, a signaling message received from the gateway, and/or an indication embedded in the last forward link packet.

At block 1112, the UT 400 may transmit a last return link packet to the first gateway via the first satellite. Following the transmission of the last return link packet, the UT 400 may execute the handoff from the first satellite to the second satellite. That is, at block 1114 the UT 400 may terminate or suspend the return link transmission via the first satellite, and may begin buffering return link data for the duration of the repointing of the antenna. Thus, at block 1116, the UT 400 may repoint the antenna from the first satellite to the second satellite, and at block 1118, may initiate transmission on the return link to the second gateway via the second satellite.

As described above, in an aspect of the disclosure, the UT 400 may receive no handoff control packets from the gateway during a time period between the last forward link packet transmission and the first forward link packet transmission.

While the above discussion in relation to FIGS. 8-11 related to exemplary algorithms wherein, following the repointing of the antenna, the UT 400 immediately began transmission of the return link via the target satellite, this is not the only example within the scope of the present disclosure. That is, in a further aspect of the disclosure, described below and illustrated in FIGS. 12-15, following the repointing of the antenna, the UT 400 may continue buffering return link data until such time as it receives a first forward link packet, after which, it may begin transmission of the return link.

Figure 12:
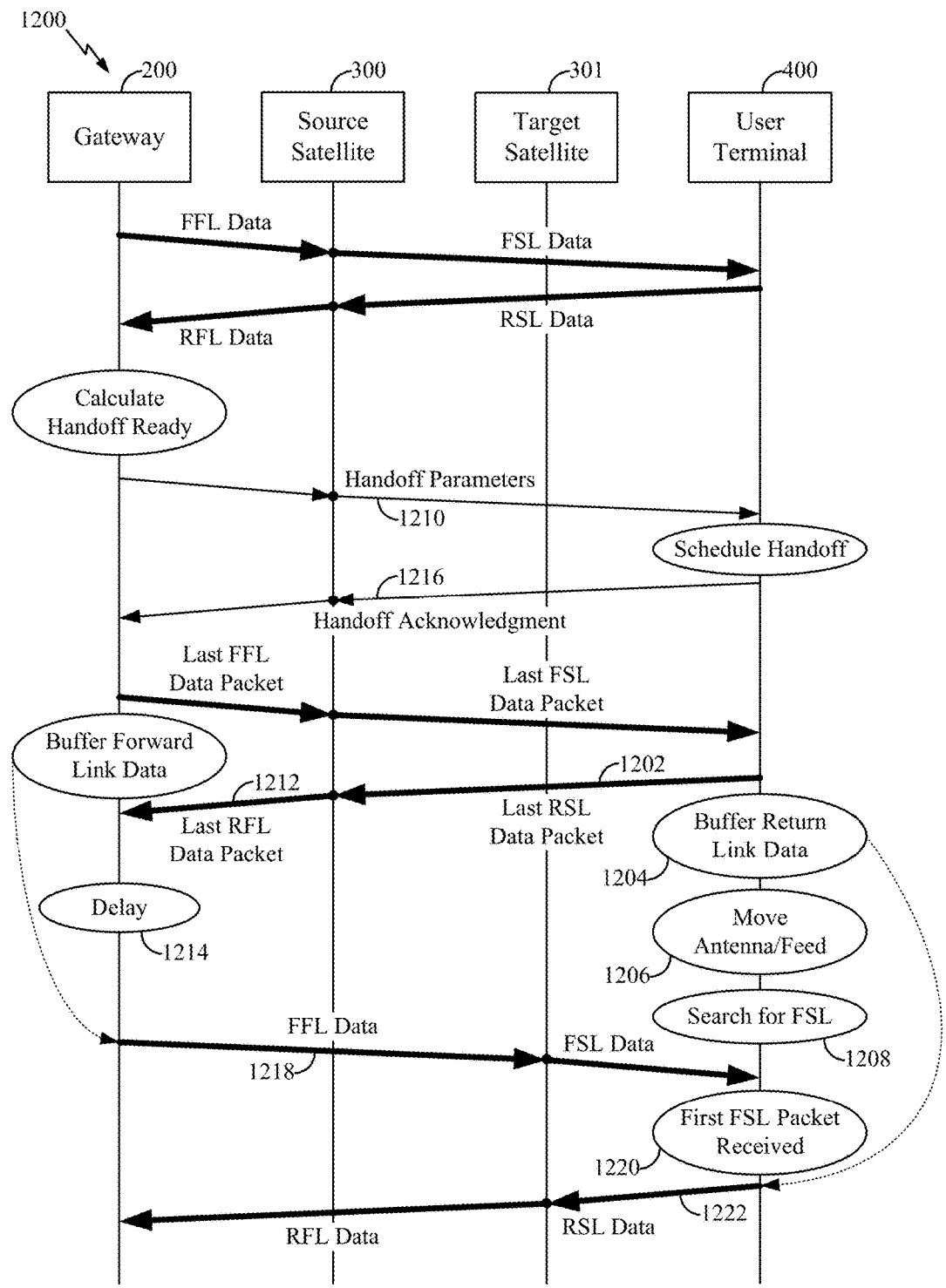
FIG. 12 is a call flow diagram illustrating a third example of a satellite-to-satellite handoff procedure according to an aspect of the disclosure.

For example, FIG. 12 is a call flow diagram illustrating a third exemplary satellite-to-satellite handoff procedure 1200. As illustrated, the satellite-to-satellite handoff procedure 1200 may be performed by a gateway 200, a source satellite 300, a target satellite 301, and the user terminal 400 described above, and illustrated, for example, in FIGS. 1, 2, 3, 4, 7, 8, 10, and/or 14.

In this example, while most of the procedures are the same or similar to those described above and illustrated in FIG. 8, here, the operations of the UT 400 differ following the moving of the antenna. Because most of the steps and actions in the procedure 1200 are the same or similar to those in procedure 800, for the sake of brevity, those actions are not described herein.

In this example, following the transmission of a last return link packet 1202 from the UT 400 (if such transmission occurs), the UT 400 may terminate or suspend the return link, and at 1204, may begin buffering user data until the handoff is complete. Further, at 1206 the UT 400 may immediately (or after a suitable delay) begin repointing the antenna or feed. In this example, once the repointing of the antenna/feed is complete, at 1208 the UT 400 may begin searching for the forward link transmitted from the gateway 200 via the target satellite 301. For example, the UT 400 may monitor the time and frequency resources assigned for the forward link transmissions from the target satellite 301 as indicated in the handoff message 1210.

At the gateway 200, following reception of the last return link packet 1212 from the UT 400 via the source satellite 300, at 1214 the gateway 200 may employ a suitable delay. For example, the delay may correspond to one or more parameters in the handoff message 1210 and/or the handoff acknowledgment message 1216. That is, the gateway 200 may have, or may determine, information relating to the time for moving the antenna or feed at the UT 400 from the source satellite 300 to the target satellite 301. In other examples, the delay 1214 may be a fixed delay, or any delay independent of the time for moving the antenna or feed at the UT 400. In still other examples, the delay 1214 may be optional, or may be avoided. Following the delay 1214, if such delay occurs, the gateway 200 may resume transmission of the forward link 1218 to the UT 400 via the target satellite 301. At the UT 400, at 1220, when the first forward link packet is received, the UT 400 may take this first forward link packet as a trigger to begin transmission of the return link 1222, including any buffered return link data.

Figure 13:
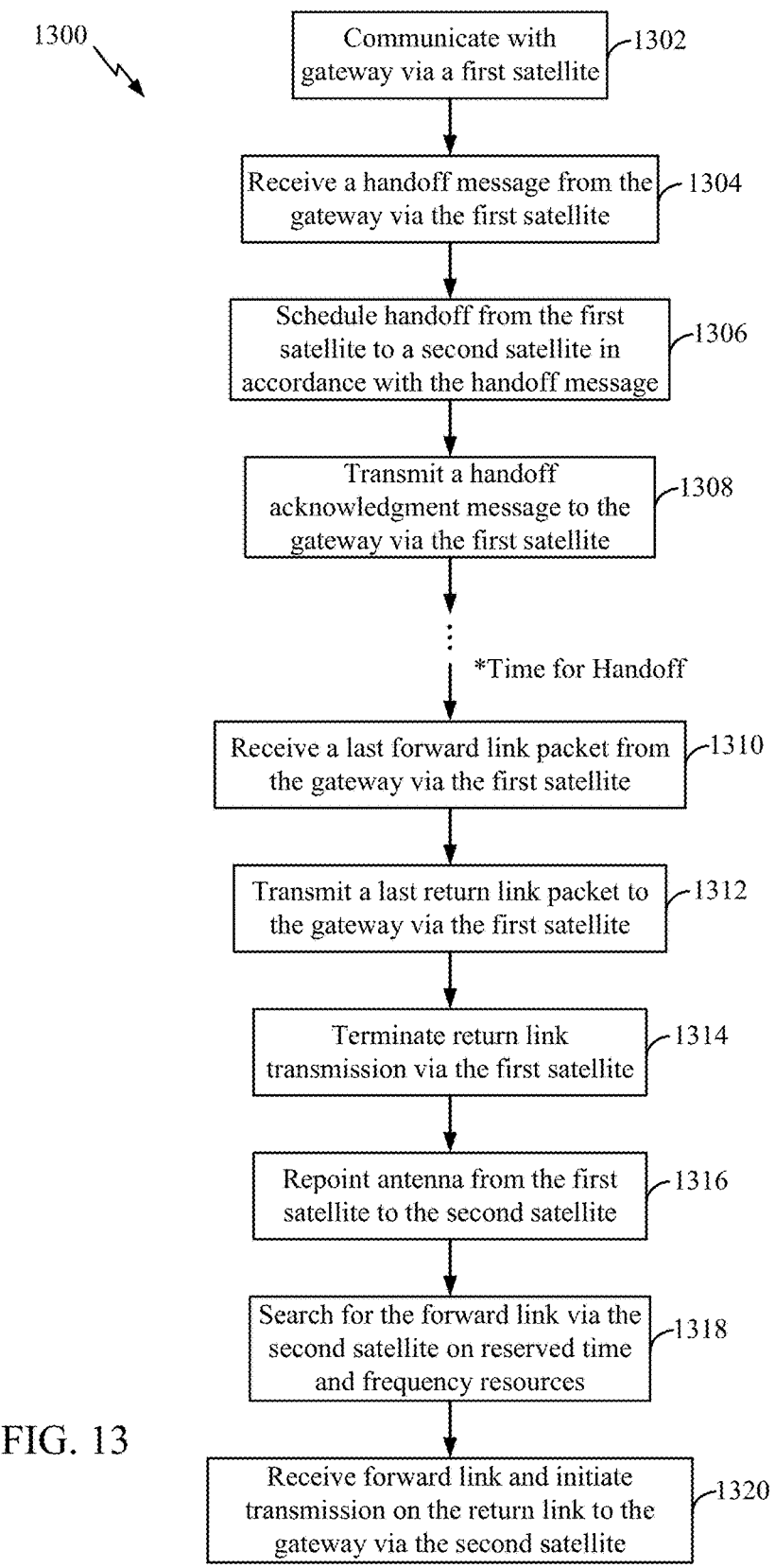
FIG. 13 is a flow chart further illustrating the satellite-to-satellite handoff procedure illustrated in FIG. 12.

FIG. 13 is a flow chart illustrating an exemplary process 1300 for a satellite-to-satellite handoff according to some aspects of the disclosure, e.g., corresponding to the call flow diagram of FIG. 12. The handoff process 1300 may be performed by a UT illustrated in any of FIGS. 1, 4, 7, 8, 10, 12, and/or 14. In one particular example, the UT may be the UT 400 illustrated in FIG. 4, equipped with an antenna similar to the antenna 600 illustrated in FIG. 6.

At block 1302, the UT 400 may communicate with a gateway (e.g., the gateway 200) via a first satellite (e.g., the source satellite 300). For example, a forward link may flow from the gateway to the UT via the first satellite, and a return link may flow from the UT to the gateway via the first satellite.

At block 1304, the UT 400 may receive a handoff message from the gateway, via the first satellite. Here, the handoff message may include information sufficient for the UT 400 to identify a target satellite, and to determine a time for a handoff from the first satellite to the second satellite. That is, the handoff message may identify a second satellite as a target satellite for the handoff, or may include suitable parameters to enable the UT 400 to repoint its antenna toward the second satellite.

At block 1306, the UT 400 may schedule the handoff from the first satellite to the second satellite in accordance with the handoff message. Here, the handoff may be scheduled at a later time, e.g., corresponding to the orbital patterns of LEO satellites in the LEO satellite communication network. In some examples, scheduling the handoff may include determining a direction for pointing the antenna at the UT 400 to the second satellite based on at least one of information contained in the handoff message, information received from a broadcast channel, or ephemeris broadcast.

At block 1308, in response to handoff message, the UT 400 may transmit a handoff acknowledgment message to the gateway via the first satellite. In some examples, the handoff acknowledgment message may include a projected time for repointing the antenna to the second satellite.

As illustrated in FIG. 13, some time may pass following the transmission of the handoff acknowledgment message. That is, the transmission of the handoff acknowledgment message may be made at a time independent of an actual handoff taking place. Here, the time for the handoff, as indicated in the handoff message, may correspond to the orbital pattern of the satellites.

At block 1310, the UT 400 may receive a last forward link packet from the gateway via the first satellite. In some examples, the last forward link packet may be identified as being the last forward link packet, e.g., by at least one of a schedule or frame number included in the handoff message, a signaling message received from the gateway, and/or an indication embedded in the last forward link packet.

At block 1312, the UT 400 may transmit a last return link packet to the gateway via the first satellite. Following the transmission of the last return link packet, the UT 400 may execute the handoff from the first satellite to the second satellite. That is, at block 1314 the UT 400 may terminate or suspend the return link transmission via the first satellite, and may begin buffering return link data for the duration of the repointing of the antenna. Thus, at block 1316, the UT 400 may repoint the antenna from the first satellite to the second satellite.

At block 1318, the UT 400 may search for the forward link from the gateway via the second satellite on time and frequency resources reserved for the forward link, and at block 1320, the UT 400 may receive the forward link. Here, the reception of the first forward link packet may trigger the UT 400 to initiate the transmission of the return link to the gateway via the second satellite utilizing the time and frequency resources reserved for the return link transmission.

As described above, in an aspect of the disclosure, the UT 400 may receive no handoff control packets from the gateway during a time period between the last forward link packet transmission and the reception of the first forward link packet.

Figure 14:
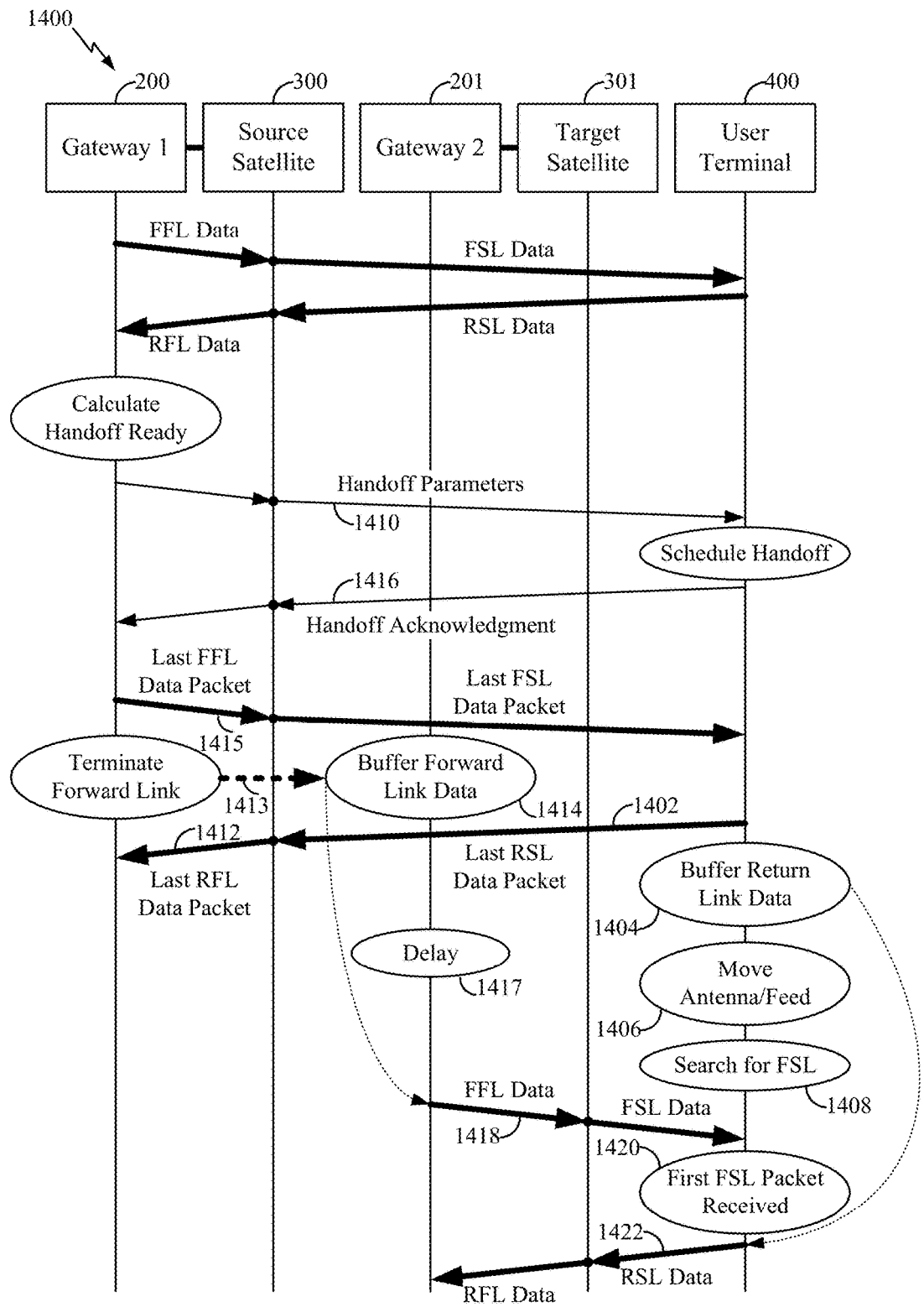
FIG. 14 is a call flow diagram illustrating a fourth example of a satellite-to-satellite handoff procedure according to an aspect of the disclosure.

Referring now to FIG. 14, a call flow diagram illustrates a fourth exemplary satellite-to-satellite handoff procedure 1400. As illustrated, the satellite-to-satellite handoff procedure 1400 may be performed by a first gateway 200, a second gateway 201, a source satellite 300, a target satellite 301, and the user terminal 400 described above, and illustrated, for example, in FIGS. 1, 2, 3, 4, 7, 8, 10, and/or 12.

In this example, while most of the procedures are the same or similar to those described above and illustrated in FIGS. 8 and 10, here, the operations of the UT 400 differ following the moving of the antenna. Because most of the steps and actions in the procedure 1400 are the same or similar to those in procedures 800 and 1000, for the sake of brevity, those actions are not described herein.

In this example, following the transmission of a last return link packet 1402 from the UT 400 (if such transmission occurs), the UT 400 may terminate or suspend the return link, and at 1404, may begin buffering user data until the handoff is complete. Further, at 1406 the UT 400 may immediately (or after a suitable delay) begin repointing the antenna or feed. In this example, once the repointing of the antenna/feed is complete, at 1408 the UT 400 may begin searching for the forward link transmitted from the second gateway 201 via the target satellite 301. For example, the UT 400 may monitor the time and frequency resources assigned for the forward link transmissions from the target satellite 301 as indicated in the handoff message 1410.

At the first gateway 200, following reception of the last return link packet 1412 from the UT 400 via the source satellite 300, at 1413 the first gateway 200 may forward or transfer any packets for the UT 400 to the second gateway 201. Furthermore, following the transmission of the last forward link packet 1415, suitable signaling and communication may take place to indicate to the infrastructure 106 that the second gateway 201 will be the node from which forward link data will be transmitted to the UT 400. Thus, at this point, at 1414 the second gateway 201 may begin to buffer any forward link data that it may receive from the infrastructure 106 until the handoff is complete.

At 1417 the second gateway 200 may employ a suitable delay. For example, the delay may correspond to one or more parameters in the handoff message 1410 and/or the handoff acknowledgment message 1416. That is, the first gateway 200 and/or the second gateway 201 may have, or may determine, information relating to the time for moving the antenna or feed at the UT 400 from the source satellite 300 to the target satellite 301. In other examples, the delay 1417 may be a fixed delay, or any delay independent of the time for moving the antenna or feed at the UT 400. In still other examples, the delay 1417 may be optional, or may be avoided. Following the delay 1417, if such delay occurs, the second gateway 201 may resume transmission of the forward link 1418 to the UT 400 via the target satellite 301. At the UT 400, at 1420, when the first forward link packet is received, the UT 400 may take this first forward link packet as a trigger to begin transmission of the return link 1422, including any buffered return link data.

Figure 15:
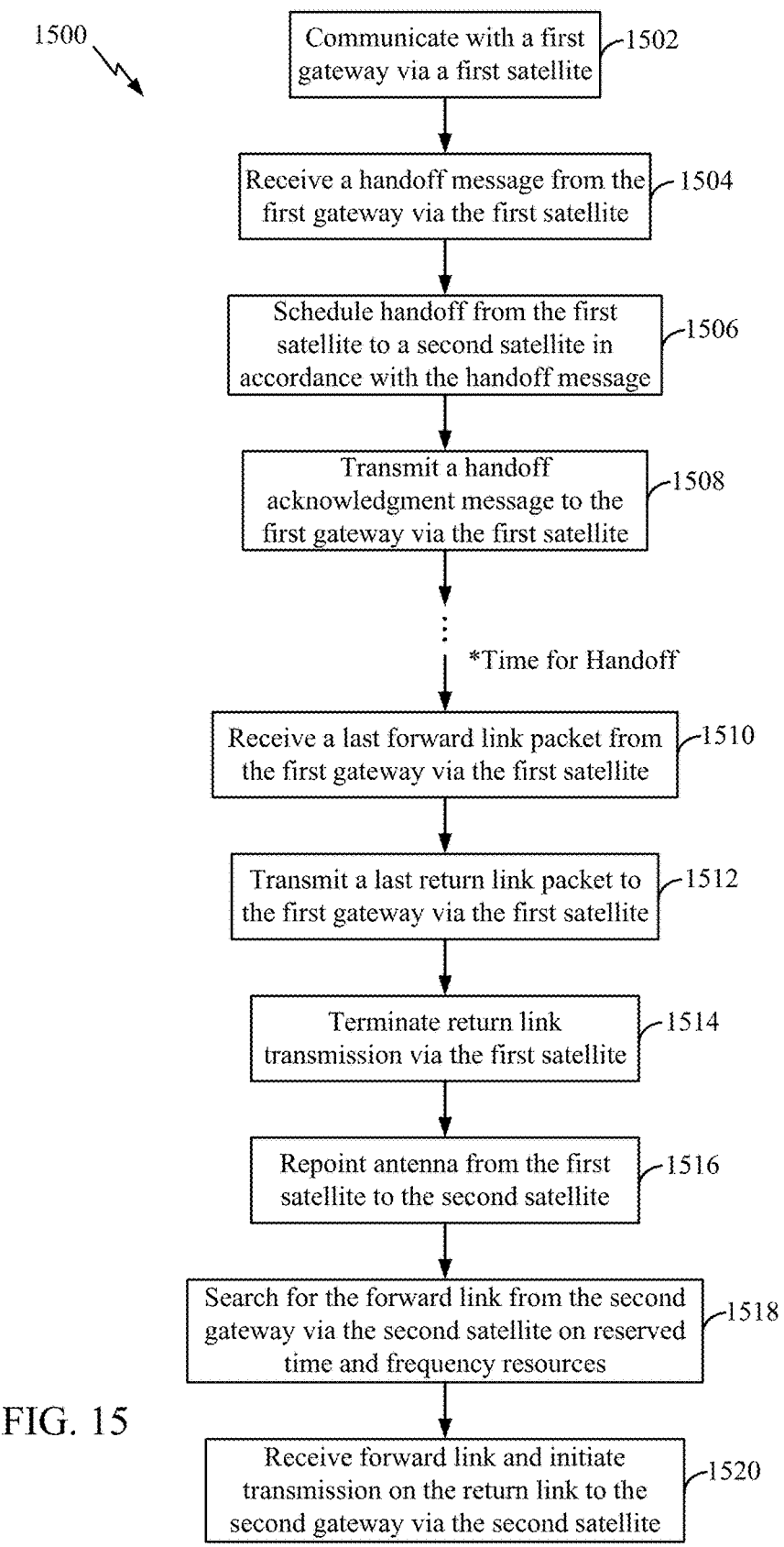
FIG. 15 is a flow chart further illustrating the satellite-to-satellite handoff procedure illustrated in FIG. 14.

FIG. 15 is a flow chart illustrating an exemplary process 1500 for a satellite-to-satellite handoff according to some aspects of the disclosure, e.g., corresponding to the call flow diagram of FIG. 14. The handoff process 1500 may be performed by a UT illustrated in any of FIGS. 1, 4, 7, 8, 10, 12, and/or 14. In one particular example, the UT may be the UT 400 illustrated in FIG. 4, equipped with an antenna similar to the antenna 600 illustrated in FIG. 6.

At block 1502, the UT 400 may communicate with a first gateway (e.g., the first gateway 200) via a first satellite (e.g., the source satellite 300). For example, a forward link may flow from the first gateway to the UT via the first satellite, and a return link may flow from the UT to the first gateway via the first satellite.

At block 1504, the UT 400 may receive a handoff message from the first gateway, via the first satellite. Here, the handoff message may include information sufficient for the UT 400 to identify a target satellite, and to determine a time for a handoff from the first satellite to the target satellite. That is, the handoff message may identify a second satellite as a target satellite for the handoff, or may include suitable parameters to enable the UT 400 to repoint its antenna toward the second satellite.

At block 1506, the UT 400 may schedule the handoff from the first satellite to the second satellite in accordance with the handoff message. Here, the handoff may be scheduled at a later time, e.g., corresponding to the orbital patterns of LEO satellites in the LEO satellite communication network. In some examples, scheduling the handoff may include determining a direction for pointing the antenna at the UT 400 to the second satellite based on at least one of information contained in the handoff message, information received from a broadcast channel, or ephemeris broadcast.

At block 1508, in response to handoff message, the UT 400 may transmit a handoff acknowledgment message to the first gateway via the first satellite. In some examples, the handoff acknowledgment message may include a projected time for repointing the antenna to the second satellite.

As illustrated in FIG. 15, some time may pass following the transmission of the handoff acknowledgment message. That is, the transmission of the handoff acknowledgment message may be made at a time independent of an actual handoff taking place. Here, the time for the handoff, as indicated in the handoff message, may correspond to the orbital pattern of the satellites.

At block 1510, the UT 400 may receive a last forward link packet from the first gateway via the first satellite. In some examples, the last forward link packet may be identified as being the last forward link packet, e.g., by at least one of a schedule or frame number included in the handoff message, a signaling message received from the first gateway, and/or an indication embedded in the last forward link packet.

At block 1512, the UT 400 may transmit a last return link packet to the first gateway via the first satellite. Following the transmission of the last return link packet, the UT 400 may execute the handoff from the first satellite to the second satellite. That is, at block 1514 the UT 400 may terminate or suspend the return link transmission to the first gateway via the first satellite, and may begin buffering return link data for the duration of the repointing of the antenna. Thus, at block 1516, the UT 400 may repoint the antenna from the first satellite to the second satellite.

At block 1518, the UT 400 may search for the forward link from the second gateway via the second satellite on time and frequency resources reserved for the forward link, and at block 1520, the UT 400 may receive the forward link. Here, the reception of the first forward link packet may trigger the UT 400 to initiate the transmission of the return link to the second gateway via the second satellite utilizing the time and frequency resources reserved for the return link transmission.

As described above, in an aspect of the disclosure, the UT 400 may receive no handoff control packets from the first gateway or the second gateway during a time period between the last forward link packet transmission and the reception of the first forward link packet.

Figure 16:
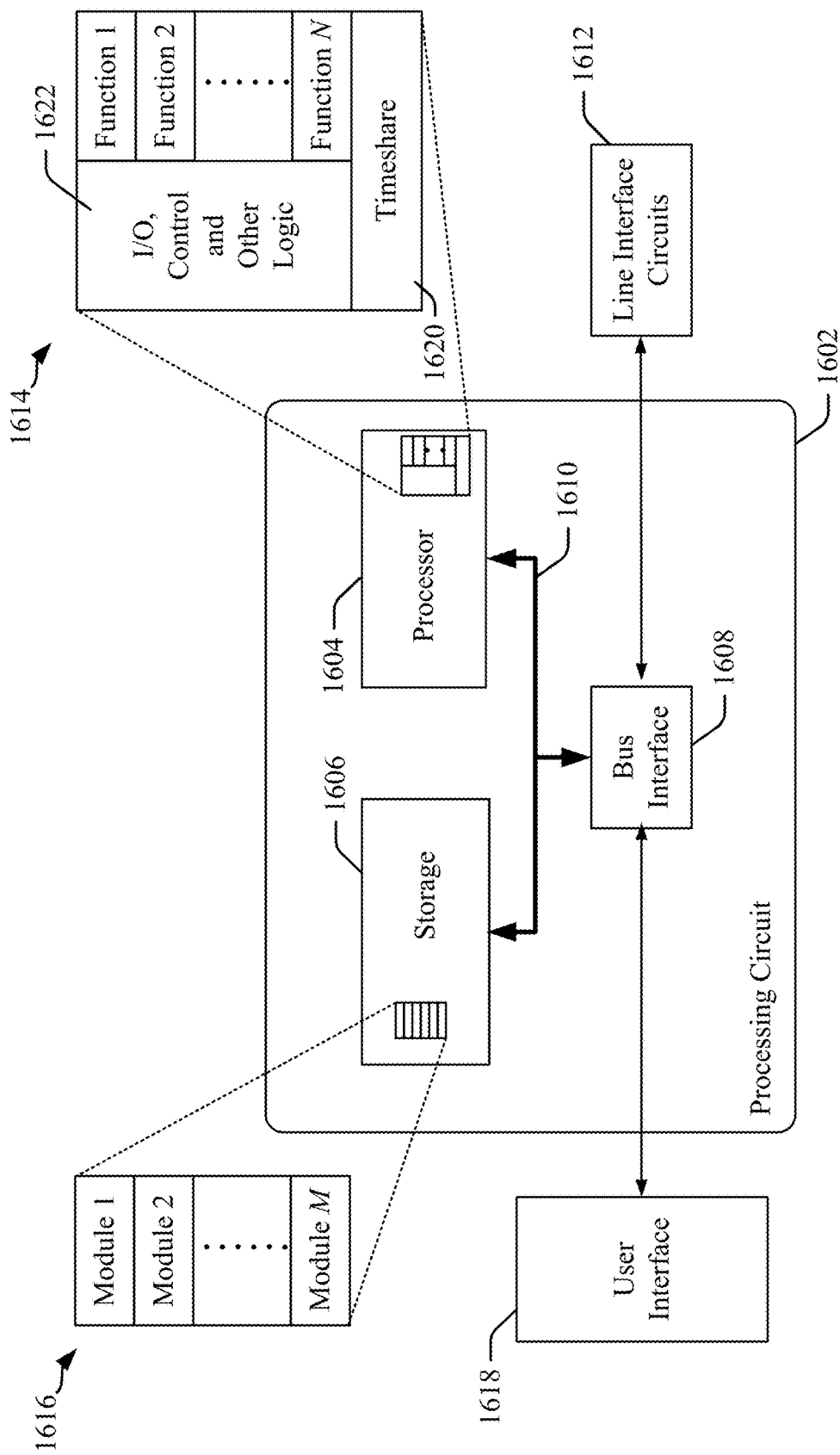
FIG. 16 is a block diagram illustrating an example of an apparatus employing a processing circuit that may be configured according to certain aspects disclosed herein.

FIG. 16 is a conceptual diagram 1600 illustrating a simplified example of a hardware implementation for an apparatus employing a processing circuit 1602 that may be configured to perform one or more functions disclosed herein. In accordance with various aspects of the disclosure, an element, or any portion of an element, or any combination of elements as disclosed herein may be implemented utilizing the processing circuit 1602. In various examples, the processing circuit 1602 may be used as one or more of the following: a processor within the gateway controller 250 illustrated in FIG. 2; a processor within the controller 340 illustrated in FIG. 3, the control processor 420 illustrated in FIG. 4, and/or the processor 512 illustrated in FIG. 5. The processing circuit 1602 may include one or more processors 1604 that are controlled by some combination of hardware and software modules. Examples of processors 1604 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable storage media and/or processor-readable storage media. The bus 1610 may also link various other circuits such as timing sources, timers, peripherals, voltage regulators, and power management circuits. A bus interface 1608 may provide an interface between the bus 1610 and one or more transceivers 1612 (a.k.a., line interface circuits). A transceiver 1612 may be provided for each networking technology supported by the processing circuit. In some instances, multiple networking technologies may share some or all of the circuitry or processing modules found in a transceiver 1612. Each transceiver 1612 provides a means for communicating with various other apparatus over a transmission medium. Depending upon the nature of the apparatus, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable storage medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer-readable storage medium. The external computer-readable storage medium and/or storage 1606 may include a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium and/or storage 1606 may also include, by way of example, a carrier wave, a transmission line, and any other suitable medium for transmitting software and/or instructions that may be accessed and read by a computer. Computer-readable storage medium and/or the storage 1606 may reside in the processing circuit 1602, in the processor 1604, external to the processing circuit 1602, or be distributed across multiple entities including the processing circuit 1602. The computer-readable storage medium and/or storage 1606 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

The storage 1606 may maintain software maintained and/or organized in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as the transceiver 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to the transceiver 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In various examples, the multitasking environment may be implemented utilizing a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable medium embodying methods for operating a user terminal (UT) to perform a handoff from a first satellite to a second satellite as described above in relation to FIGS. 8-15. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of operating a user terminal (UT) to perform a handoff from a first satellite to a second satellite, comprising:
   communicating with a first gateway over a forward link and a return link via the first satellite;
   receiving a handoff message from the first gateway via the first satellite, wherein the handoff message comprises information sufficient for the UT to identify the second satellite for the handoff, and to determine a time for the handoff from the first satellite to the second satellite;
   scheduling the handoff from the first satellite to the second satellite in accordance with the identified second satellite and the determined time; and
   executing the handoff from the first satellite to the second satellite.

2. The method of claim 1, wherein the executing the handoff comprises executing the handoff at a later time after the scheduling of the handoff.

3. The method of claim 1, wherein the executing the handoff comprises:

terminating the return link via the first satellite;
repointing an antenna at the UT from the first satellite to the second satellite; and
initiating transmission on the return link via the second satellite.

4. The method of claim 1, further comprising communicating with a second gateway via the second satellite after the handoff,
wherein the first gateway is a different gateway than the second gateway.

5. The method of claim 1, wherein the executing the handoff comprises:
transmitting a last return service link (RSL) packet to the first gateway via the first satellite; and
after repointing an antenna to utilize the second satellite, resuming the return link by transmitting a first RSL packet to a second gateway via the second satellite,
wherein the UT is configured to receive no handoff control packets from the first gateway or the second gateway during a time period between a last forward service link (FSL) packet transmission and the first RSL packet transmission.

6. The method of claim 1, further comprising determining a direction for pointing an antenna to the second satellite based on at least one of information contained in the handoff message, information received from a broadcast channel, ephemeris broadcast, or any combination thereof.

7. The method of claim 1, further comprising receiving a last forward service link (FSL) packet from the first gateway via the first satellite, wherein the last FSL packet is identified by at least one of:
a schedule or a frame number included in the handoff message;
a signaling message from the first gateway;
an indication embedded in the last FSL packet; or
any combination thereof.

8. The method of claim 1, further comprising:
in response to the handoff message, transmitting a handoff acknowledgment message to the first gateway via the first satellite,
wherein the handoff acknowledgment message comprises a projected time for repointing an antenna to the second satellite.

9. The method of claim 1, wherein the executing the handoff comprises:
prior to repointing an antenna, transmitting a last return service link (RSL) packet to the first gateway via the first satellite; and
after repointing the antenna, transmitting a first RSL packet to a second gateway via the second satellite, and receiving a first forward service link (FSL) packet via the second satellite,
wherein the UT is configured to receive no handoff control packets from the second gateway during a time period between the last RSL packet transmission and the first FSL packet transmission.

10. The method of claim 1, wherein the executing the handoff comprises:
terminating the return link via the first satellite;
repointing an antenna at the UT from the first satellite to the second satellite;
monitoring for the forward link via the second satellite in accordance with the information in the handoff message; and
initiating transmission on the return link via the second satellite following reception of a forward link packet via the second satellite.

11. A user terminal (UT) configured to perform a handoff from a first satellite to a second satellite, comprising:
a memory comprising handoff instructions; and
a processor operatively coupled to the memory,
wherein the processor and the memory are configured by the handoff instructions to:
communicate with a first gateway over a forward link and a return link via the first satellite;
receive a handoff message from the first gateway via the first satellite, wherein the handoff message comprises information sufficient for the UT to identify the second satellite for the handoff, and to determine a time for the handoff from the first satellite to the second satellite;
schedule the handoff from the first satellite to the second satellite in accordance with the identified second satellite and the determined time; and
execute the handoff from the first satellite to the second satellite.

12. The user terminal of claim 11, wherein the processor and the memory are further configured to execute the handoff at a later time after the scheduling of the handoff.

13. The user terminal of claim 11, wherein to execute the handoff, the processor and the memory are further configured to:
terminate the return link via the first satellite;
repoint an antenna at the UT from the first satellite to the second satellite; and
initiate transmission on the return link via the second satellite.

14. The user terminal of claim 11, wherein the processor and the memory are further configured to communicate with a second gateway via the second satellite after the handoff,
wherein the first gateway is a different gateway than the second gateway.

15. The user terminal of claim 11, wherein to execute the handoff, the processor and the memory are further configured to:
transmit a last return service link (RSL) packet to the first gateway via the first satellite; and
after repointing an antenna to utilize the second satellite, resume the return link by transmitting a first RSL packet to a second gateway via the second satellite,
wherein the UT is configured to receive no handoff control packets from the first gateway or the second gateway during a time period between a last forward service link (FSL) packet transmission and the first RSL packet transmission.

16. The user terminal of claim 11, wherein the processor and the memory are further configured to determine a direction for pointing an antenna to the second satellite based on at least one of information contained in the handoff message, information received from a broadcast channel, ephemeris broadcast, or any combination thereof.

17. The user terminal of claim 11, wherein the processor and the memory are further configured to receive a last forward service link (FSL) packet from the first gateway via the first satellite, wherein the last FSL packet is identified by at least one of:
a schedule or a frame number included in the handoff message;
a signaling message from the first gateway;
an indication embedded in the last FSL packet; or
any combination thereof.

18. The user terminal of claim 11, wherein the processor and the memory are further configured to:

in response to the handoff message, transmit a handoff acknowledgment message to the first gateway via the first satellite,
wherein the handoff acknowledgment message comprises a projected time for repointing an antenna to the second satellite.

19. The user terminal of claim 11, wherein to execute the handoff, the processor and the memory are further configured to:
prior to repointing an antenna, transmit a last return service link (RSL) packet to the first gateway via the first satellite; and
after repointing the antenna, transmit a first RSL packet to a second gateway via the second satellite, and receive a first forward service link (FSL) packet via the second satellite,
wherein the UT is configured to receive no handoff control packets from the second gateway during a time period between the last RSL packet transmission and the first FSL packet transmission.

20. The UT of claim 11, wherein to execute the handoff, the processor and memory are further configured to:
terminate the return link via the first satellite;
repoint an antenna at the UT from the first satellite to the second satellite;
monitor for the forward link via the second satellite in accordance with the information in the handoff message; and
initiate transmission on the return link via the second satellite following reception of a forward link packet via the second satellite.

21. A user terminal (UT) configured to perform a handoff from a first satellite to a second satellite, comprising:
means for communicating with a first gateway over a forward link and a return link via the first satellite;
means for receiving a handoff message from the first gateway via the first satellite, wherein the handoff message comprises information sufficient for the UT to identify the second satellite for the handoff, and to determine a time for the handoff from the first satellite to the second satellite;
means for scheduling the handoff from the first satellite to the second satellite in accordance with the identified second satellite and the determined time; and
means for executing the handoff from the first satellite to the second satellite.

22. The user terminal of claim 21, wherein the means for executing the handoff is configured to:
transmit a last return service link (RSL) packet to the first gateway via the first satellite; and
after repointing an antenna to utilize the second satellite, resume the return link by transmitting a first RSL packet to a second gateway via the second satellite,
wherein the UT is configured to receive no handoff control packets from the first gateway or the second gateway during a time period between a last forward service link (FSL) packet transmission and the first RSL packet transmission.

23. The user terminal of claim 21, further comprising means for receiving a last forward service link (FSL) packet from the first gateway via the first satellite, wherein the last FSL packet is identified by at least one of:
a schedule or a frame number included in the handoff message;
a signaling message from the first gateway;
an indication embedded in the last FSL packet; or
any combination thereof.

24. The user terminal of claim 21, further comprising:
means for, in response to the handoff message, transmitting a handoff acknowledgment message to the first gateway via the first satellite,
wherein the handoff acknowledgment message comprises a projected time for repointing an antenna to the second satellite.

25. The user terminal of claim 21, wherein the means for executing the handoff is configured to:
prior to repointing an antenna, transmit a last return service link (RSL) packet to the first gateway via the first satellite; and
after repointing the antenna, transmit a first RSL packet to a second gateway via the second satellite, and receive a first forward service link (FSL) packet via the second satellite,
wherein the UT is configured to receive no handoff control packets from the second gateway during a time period between the last RSL packet transmission and a first forward service link (FSL) packet transmission.

26. A non-transitory computer-readable medium, comprising a plurality of instructions for causing a user terminal (UT) to perform a handoff from a first satellite to a second satellite, the instructions cause the UT to:
communicate with a first gateway over a forward link and a return link via the first satellite;
receive a handoff message from the first gateway via the first satellite, wherein the handoff message comprises information sufficient for the UT to identify the second satellite for the handoff, and to determine a time for the handoff from the first satellite to the second satellite;
schedule the handoff from the first satellite to the second satellite in accordance with the identified second satellite and the determined time; and
execute the handoff from the first satellite to the second satellite.

27. The non-transitory computer-readable medium of claim 26, wherein to execute the handoff, the instructions cause the UT to:
transmit a last return service link (RSL) packet to the first gateway via the first satellite; and
after repointing an antenna to utilize the second satellite, resume the return link by transmitting a first RSL packet to a second gateway via the second satellite,
wherein the UT is configured to receive no handoff control packets from the first gateway or the second gateway during a time period between a last forward service link (FSL) packet transmission and the first RSL packet transmission.

28. The non-transitory computer-readable medium of claim 26, wherein the instructions further cause the UT to:
receive a last forward service link (FSL) packet from the first gateway via the first satellite, wherein the last FSL packet is identified by at least one of:
a schedule or a frame number included in the handoff message;
a signaling message from the first gateway;
an indication embedded in the last FSL packet; or
any combination thereof.

29. The non-transitory computer-readable medium of claim 26, wherein the instructions further cause the UT to:
in response to the handoff message, transmit a handoff acknowledgment message to the first gateway via the first satellite,
wherein the handoff acknowledgment message comprises a projected time for repointing an antenna to the second satellite.

30. The non-transitory computer-readable medium of claim 26, wherein the instructions further cause the UT to:
prior to repointing an antenna, transmit a last return service link (RSL) packet to the first gateway via the first satellite; and
after repointing the antenna, transmit a first RSL packet to a second gateway via the second satellite, and receive a first forward service link (FSL) packet via the second satellite,
wherein the UT is configured to receive no handoff control packets from the second gateway during a time period between the last RSL packet transmission and the first FSL packet transmission.

* * * * *